United States Patent
Suzuki et al.

(10) Patent No.: US 10,924,047 B2
(45) Date of Patent: Feb. 16, 2021

(54) CONTROL DEVICE FOR THREE-PHASE ROTARY MACHINE

(71) Applicant: DENSO CORPORATION, Kariya (JP)

(72) Inventors: Takashi Suzuki, Kariya (JP); Hiroyasu Otake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/560,036

(22) Filed: Sep. 4, 2019

(65) Prior Publication Data
US 2020/0083833 A1    Mar. 12, 2020

(30) Foreign Application Priority Data
Sep. 7, 2018   (JP) .................... 2018-167797

(51) Int. Cl.
| | |
|---|---|
| H02P 21/05 | (2006.01) |
| H02P 21/22 | (2016.01) |
| H02P 25/22 | (2006.01) |
| H02P 27/12 | (2006.01) |
| B62D 5/04 | (2006.01) |

(52) U.S. Cl.
CPC ............ *H02P 21/05* (2013.01); *B62D 5/0403* (2013.01); *B62D 5/0463* (2013.01); *H02P 21/22* (2016.02); *H02P 25/22* (2013.01); *H02P 27/12* (2013.01); *B62D 5/0412* (2013.01)

(58) Field of Classification Search
CPC .......... H02P 21/05; H02P 21/22; H02P 25/22; H02P 27/12; B62D 5/0403; B62D 5/0463; B62D 5/0412

USPC ...................................................... 318/400.02
See application file for complete search history.

(56) References Cited

U.S. PATENT DOCUMENTS

| | | | |
|---|---|---|---|
| 9,979,340 B2 * | 5/2018 | Suzuki | .................... H02P 21/05 |
| 2013/0099707 A1 | 4/2013 | Okubo | |
| 2014/0062375 A1 * | 3/2014 | Suzuki | .................... H02P 21/22 |
| | | | 318/496 |
| 2017/0373627 A1 | 12/2017 | Suzuki | |

FOREIGN PATENT DOCUMENTS

| | | |
|---|---|---|
| JP | 2013-085439 A | 5/2013 |
| JP | 2017-229150 A | 12/2017 |

* cited by examiner

*Primary Examiner* — Kawing Chan
(74) *Attorney, Agent, or Firm* — Maschoff Brennan

(57) ABSTRACT

A control device is provided for a three-phase rotary machine including two three-phase-winding sets. The control device includes two power converters for outputting alternating currents with a same amplitude and a phase difference of (30±60×n) degrees to the two three-phase-winding sets and a control unit for controlling energization of the three-phase rotary machine by calculating a d-axis current and a q-axis current of a 6(2k+1)th component to be superimposed on a fundamental wave component on dq coordinates so as to reduce a phase current peak value. The control unit calculates currents so that a high-order dq amplitude ratio is 0 when a fundamental wave current amplitude is a first threshold or less, and the high-order dq amplitude ratio is 1 when the fundamental wave current amplitude is larger than a second threshold.

4 Claims, 15 Drawing Sheets

FIG. 15

| CURRENT | $K_{t5}$ ($\times K_{t0}$) | $|L_d - L_q|$ ($\times K_{t0}$) | TORQUE RIPPLE $T_{RIP}$ ($\times K_{t0}$) ($Iq_0 = 100[A]$) | | |
|---|---|---|---|---|---|
| | | | 6TH-ORDER dq-AXIS CUR AMP | | |
| | | | $Id_6 = 0$ $Iq_6 = Iq_0 \times 0.05$ $\frac{Id_6}{Iq_6} = 0$ | | $Id_6 = Iq_6 = Iq_0 \times 0.05$ $\frac{Id_6}{Iq_6} = 1$ |
| REGION I | 0.01 | 0.1 | 0.1 (*1) | < | 5 (*2) |
| REGION II | 0.065 | 0.013 | 0.65 | = | 0.65 |
| REGION III | 0.08 | 0.01 | 0.8 | > | 0.5 |

(*1)
$$T_{RIP} \approx K_{t5} \times 2(Iq_6 - Id_6) + 0$$
$$= (K_{t0} \times 0.01) \times 2 \times (Iq_0 \times 0.05)$$
$$= K_{t0} \times Iq_0 \times 0.001$$
$$= K_{t0} \times 0.1$$

(*2)
$$T_{RIP} \approx 0 - (L_d - L_q) \times 2(Id_6 \times Iq_6)$$
$$= (K_{t0} \times 0.1) \times 2 \times (Iq_0 \times 0.05) \times (Iq_0 \times 0.05)$$
$$= K_{t0} \times Iq_0^2 \times 0.0005$$
$$= K_{t0} \times 5$$

CONTROL DEVICE FOR THREE-PHASE ROTARY MACHINE

CROSS-REFERENCE TO RELATED APPLICATIONS

This application is based on Japanese Patent Application No. 2018-167797 filed on Sep. 7, 2018, disclosure of which is incorporated herein by reference

TECHNICAL FIELD

The present disclosure relates to a control device for a three-phase rotary machine.

BACKGROUND

There is a technology where a control device for a three-phase rotary machine including two winding sets calculates a dq-axis current of a sixth-order component to be superimposed on a zeroth-order component on dq coordinates and thereby generates the fifth-order and seventh-order harmonic components to be superimposed on phase current first-order component so that a phase current peak value is reduced.

For example, Patent Literature 1 (JP-2017-229150A corresponding to US2017/0373627A1, which are incorporated herein by reference) discloses the following technology. A control device for a three-phase rotary machine, which generates torque being a sum of magnet torque and reluctance torque, calculates current so that an amplitude of a sixth-order q-axis current is larger than an amplitude of a sixth-order d-axis current. This technology may reduce vibration and noise caused by torque ripple, and may reduce heat generation and loss caused by the phase current peak value.

It is possible to increase output torque by increasing a current supplied to the three-phase rotary machine. However, when a large current is supplied, the heat generation becomes large, and there is a possibility of the performance deterioration or failure generation of the three-phase rotary machine due to magnetic saturation. Patent Literature 1 fails to address the reduction in torque ripple in a region where the magnetic saturation occurs.

SUMMARY

The present disclosure provides a control device for a three-phase rotary machine that generates torque being a sum of magnet torque and reluctance torque, and that is capable of reducing torque ripple even when magnetic saturation occurs due to application of a large current.

In an aspect of the present disclosure, there is provided a control device for a three-phase rotary machine. The three-phase rotary machine includes two sets of three-phase windings and is configured to generate torque being a sum of magnet torque and reluctance torque when alternating currents with different phases are supplied to the two sets of three-phase windings. The control device comprises two power converters and a control unit.

The two power converters are provided corresponding to the two sets of three-phase windings and output alternating currents with a same amplitude and a phase difference of $(30\pm60\times n)$ degrees to the two sets of three-phase windings, where n is an integer. The control unit controls energization of the three-phase rotary machine by calculating a d-axis current and a q-axis current of a $6(2k+1)$th component to be superimposed on a fundamental wave component on dq coordinates so as to reduce a peak value of phase current that is supplied to the two sets of three-phase windings, where k is an integer of 0 or larger.

Now, a ratio of an amplitude of the d-axis current of a $6(2k+1)$th component to an amplitude of a q-axis current of the $6(2k+1)$th component is defined as a high-order dq amplitude ratio. The control unit calculates the d-axis current and the q-axis current of the $6(2k+1)$th component so that the high-order dq amplitude ratio is 0 when a fundamental wave current amplitude is equal to or smaller than a first threshold, and the high-order dq amplitude ratio is 1 when the fundamental wave current amplitude is larger than a second threshold that is equal to or larger than the first threshold.

For example, the fundamental wave current amplitude may be set so that the magnetic saturation starts at the first threshold and the magnetic saturation has been reached at the second threshold. In a region where the fundamental wave current amplitude is smaller than or equal to the first threshold, the torque ripple is minimum when the high-order dq amplitude ratio is zero. In a region where the fundamental wave current amplitude is larger than the second threshold, the torque ripple is minimum when the high-order dq amplitude ratio is 1.

In view of this, the amplitude ratio of the dq-axis current of the $6(2k+1)$th component to be superimposed on the zeroth-order component on the dq coordinates is changed in accordance with the fundamental wave current amplitude. Therefore, for the three-phase rotary machine configured to generate the torque being a sum of magnet torque and reluctance torque, it is possible to appropriately reduce heat generation without increasing the torque ripple even when either a small current or a large current is supplied. This control device may be particularly effective in an electric power steering apparatus which is typically required to simultaneously achieve both the reduction in a large-current-caused heat generation and the reduction in torque-ripple-caused noise and vibration.

BRIEF DESCRIPTION OF DRAWINGS

Features and advantages of the present disclosure will become more apparent from the following detailed description made with reference to the accompanying drawings, in which:

FIG. 15 is a diagram illustrating numerical examples of torque ripple in each current region;

DETAILED DESCRIPTION

Hereinafter, embodiments of a control device for a three-phase rotary machine will be described based on the drawings. In the present embodiment, an electronic control unit (ECU) serving as a control device for a three-phase rotary machine is applied to an electric power steering apparatus of a vehicle to control energization of a motor (i.e., three-phase rotary machine) that generates steering assist torque. First, an overall configuration will be described with reference to FIGS. 1 to 6.

<Configuration of Electric Power Steering Apparatus>

Figure 1:
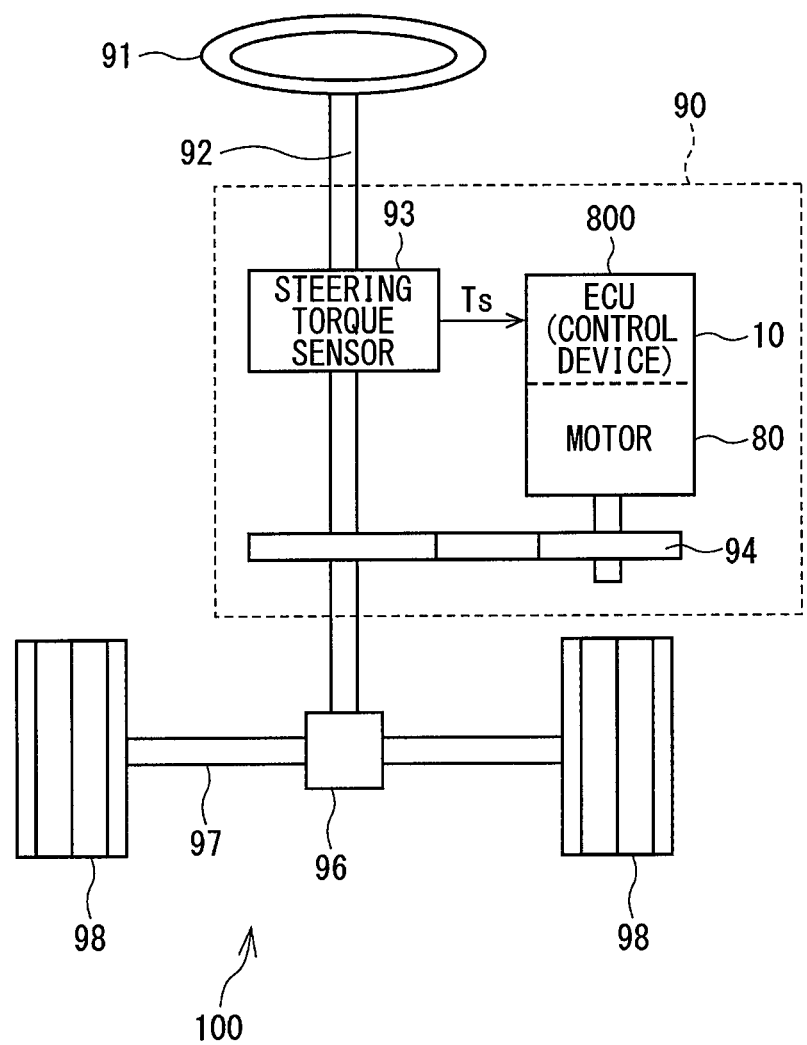
FIG. 1 is a diagram schematically illustrating an electric power steering apparatus to which a control device for a three-phase rotary machine according to one embodiment is applied.

FIG. 1 shows the overall configuration of a steering system 100 including an electric power steering apparatus 90. Although FIG. 1 illustrates a machine-electricity integral type motor unit 800 in which an ECU 10 is integrally formed on one side in an axial direction of a motor 80, the present embodiment is similarly applicable to a machine-electrical-separate type in which the ECU 10 and the motor 80 are connected by a harness. Further, although the electric power steering apparatus 90 shown in FIG. 1 is a column assist type, the present embodiment is similarly applicable to a rack assist type electric power steering apparatus.

The steering system 100 includes a steering wheel 91, a steering shaft 92, a pinion gear 96, a rack shaft 97, tire wheels 98, the electric power steering apparatus 90, and the like. The steering shaft 92 is connected to the steering wheel 91. A pinion gear 96 provided at the tip of the steering shaft 92 meshes with the rack shaft 97. Tire wheels 98 constituting a tire wheel pair are provided at both ends of the rack shaft 97 via tie rods or the like. When a driver rotates the steering wheel 91, the steering shaft 92 connected to the steering wheel 91 is rotated. The rotational movement of the steering shaft 92 is converted to the linear movement of the rack shaft 97 by the pinion gear 96, and the pair of tire wheels 98 is steered at an angle corresponding to the displacement amount of the rack shaft 97.

The electric power steering apparatus 90 includes a steering torque sensor 93, the ECU 10, the motor 80, a reduction gear 94, and the like. The steering torque sensor 93 is provided midway of the steering shaft 92 and detects a steering torque Ts of the driver. The ECU 10 controls driving of the motor 80 so that the motor 80 generates desired assist torque based on the steering torque Ts. The assist torque output from the motor 80 is transmitted to the steering shaft 92 via the reduction gear 94.

The configuration of the machine-electricity integral type motor unit 800 in which the ECU 10 is integrally formed on one side in the axial direction of the motor 80 will be described with reference to FIGS. 2 to 4. In the embodiment shown in FIG. 2, the ECU 10 is disposed coaxially with an axis Ax of a shaft 87 so that the ECU 10 is on an opposite side of the shift 87 from a motor 80 output side. In another embodiment, the ECU 10 may be configured integrally with the motor 80 so that the ECU 10 is on the motor 80 output side. The motor 80 is a three-phase brushless motor and includes a stator 840, a rotor 860, and a housing 830 for housing the stator 840 and the rotor 860.

The stator 840 includes a stator core 844 fixed to the housing 830 and two sets of three-phase windings 801, 802 assembled to the stator core 844. Lead wires 851, 853, 855 extend from the respective phase windings constituting the first winding set 801. Lead wires 852, 854, 856 extend from the respective phase windings constituting the second winding set 802. Each phase winding is wound about each slot 848 of the stator core 844. Hereinafter, units including the winding set and each constituent corresponding to the winding set are referred to as a system. The present embodiment has a two-system configuration.

The rotor 860 includes the shaft 87 and a rotor core 864. The shaft 87 is supported by a rear bearing 835 and a front bearing 836. The rotor core 864 is fitted with the shaft 87. The rotor 860 is provided inside the stator 840 and is rotatable relative to the stator 840. The motor 80 of the present embodiment is an embedded magnet type synchronous rotary machine (so-called IPMSM (interior permanent magnet synchronous motor)) in which a plurality of magnets 865 are embedded in the outer periphery of the rotor core 864. At one end of the shaft 87, a permanent magnet 88 for detecting a rotational angle is provided.

The housing 830 includes a bottomed cylindrical case 834 and a front frame end 838 provided at one end of the case 834. The bottomed cylindrical case 834 includes a rear frame end 837. The front frame end 838 is provided at one end of the case 834. The case 834 and the front frame end 838 are fastened to each other by bolts or the like. The lead wires 851, 852, and the like of the respective winding sets 801, 802 are inserted through lead wire insertion holes 839 of the rear frame end 837 and extend toward the ECU 10 and are connected to a circuit board 230.

The ECU 10 includes a cover 21, a heatsink 22 fixed to the cover 21, the circuit board 230 fixed to the heatsink 22, and various electronic components mounted on the circuit board 230. The cover 21 protects the electronic component from external impact and prevents dust, water, and the like from entering into the ECU 10. The cover 21 includes a connector portion 214 for external connection and a cover portion 213. The connector portion 214 is to be connected to a feed cable and a signal cable from the outside. Feeding terminals 215, 216 of the connector portion 214 for external connection are connected to the circuit board 230 via paths (not shown).

The circuit board 230 is, for example, a printed circuit board. The circuit board 230 is provided at a position facing the rear frame end 837 and is fixed to the heatsink 22. On the circuit board 230, electronic components for two systems are provided independently for each system. In the present embodiment, a single circuit board 230 is provided, but in another embodiment, two or more circuit boards may be provided. Of two main surfaces of the circuit board 230, one main surface facing the rear frame end 837 is referred to as a motor surface 237. The other main surface, which is opposite to the motor surface 237 and which faces the heatsink 22, is referred to as a cover surface 238.

On the motor surface 237, a plurality of switching elements 241, 242, rotational angle sensors 251, 252, custom ICs 261, 262, and the like are mounted. In the present embodiment, the numbers of plural switching elements 241, 242 are six for each system to constitute three-phase upper and lower arms of a motor drive circuit. The rotational angle sensors 251, 252 are disposed so as to face the permanent magnet 88 provided at the tip of the shaft 87. The custom ICs 261, 262 and microcomputers 671, 672 include a control circuit of the ECU 10.

On the cover surface 238, the microcomputers 671, 672, capacitors 281, 282, inductors 271, 272, and the like are mounted. In particular, the first microcomputer 671 and the second microcomputer 672 are arranged at a predetermined interval on the cover surface 238 which is the surface on the same side of the same circuit board 230. The capacitors 281, 282 smooth power input from a power supply and prevent noise caused by the switching operation of the switching elements 241, 242 from leaking to an outside. The inductors 271, 272 form a filter circuit together with the capacitors 281, 282.

Figure 2:
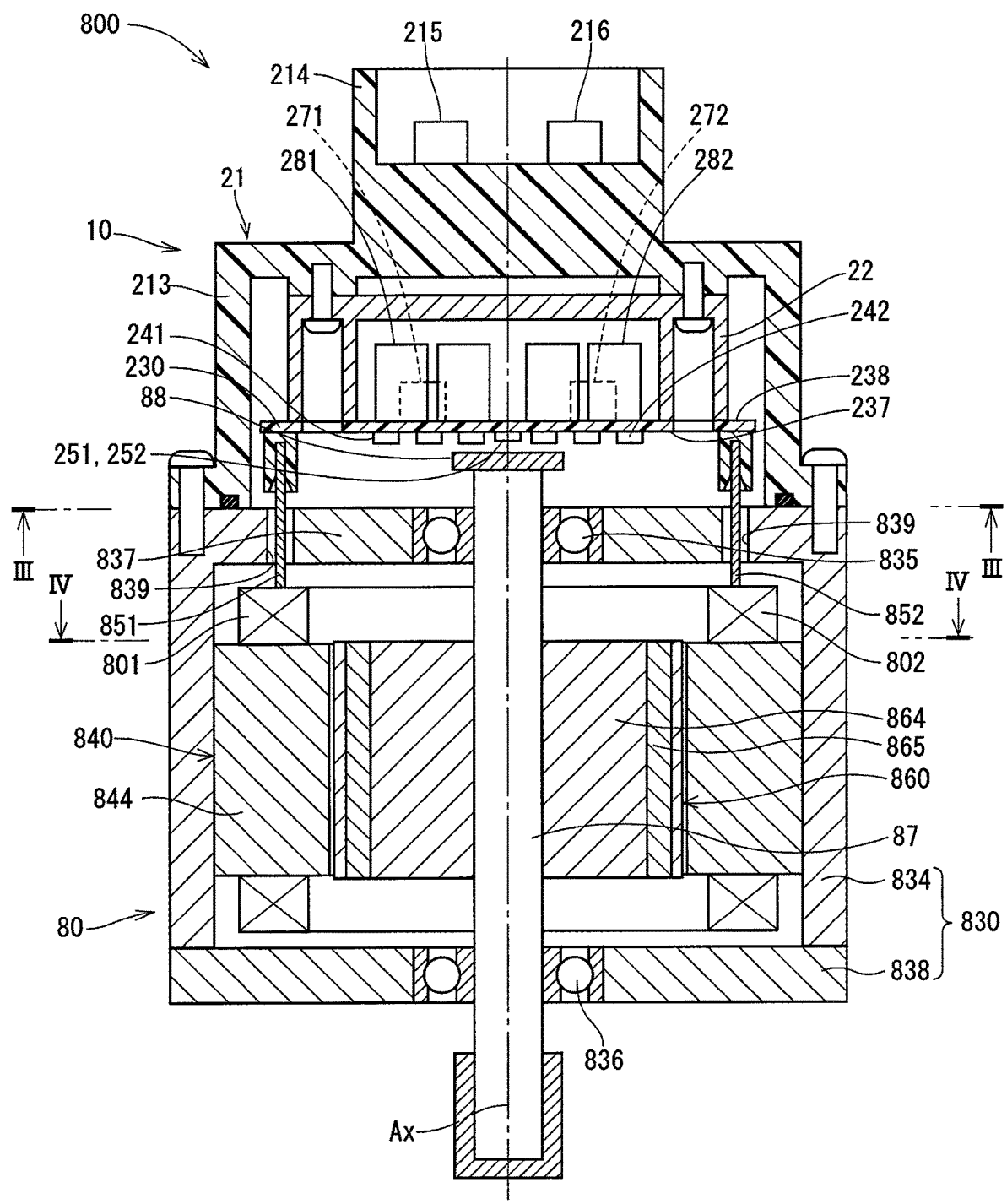
FIG. 2 is an axial sectional view of a two-system machine-electricity integral motor.
Figure 3:
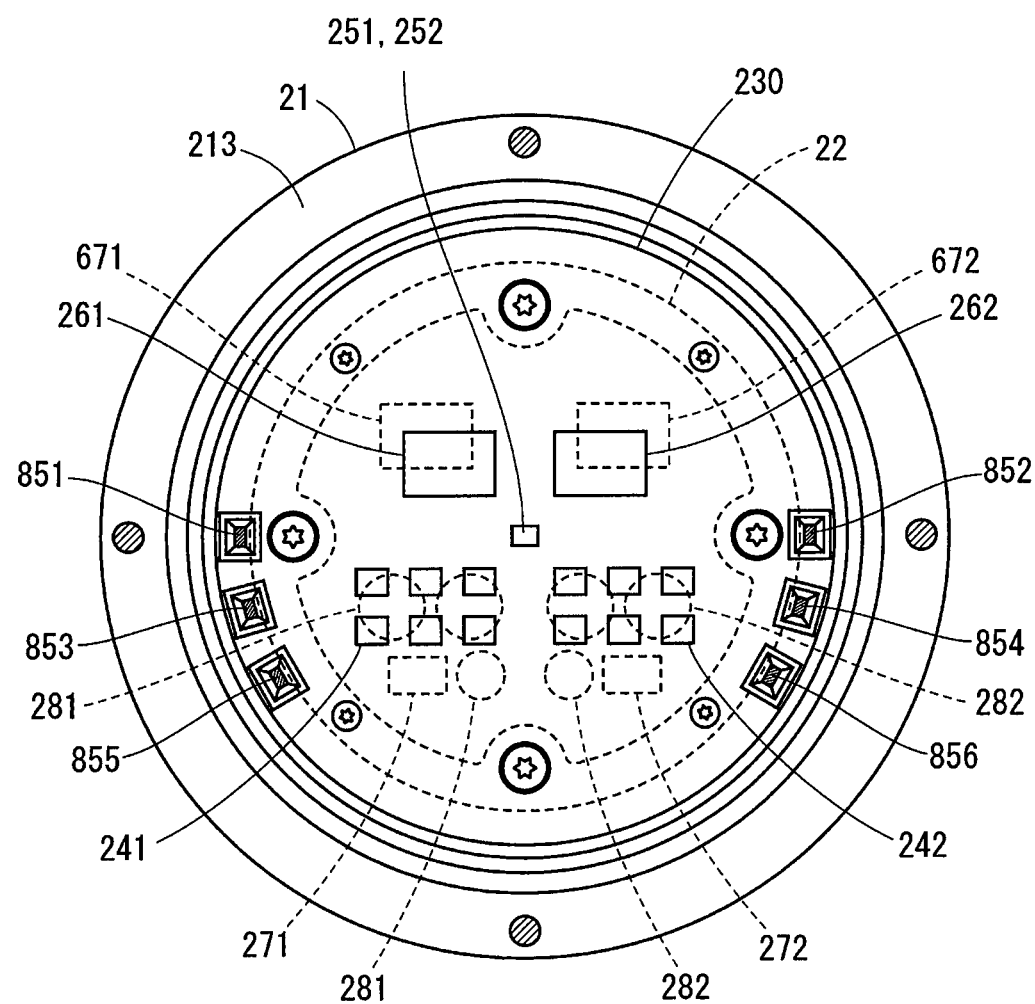
FIG. 3 is a sectional view taken along a line III-Ill of FIG. 2.
Figure 4:
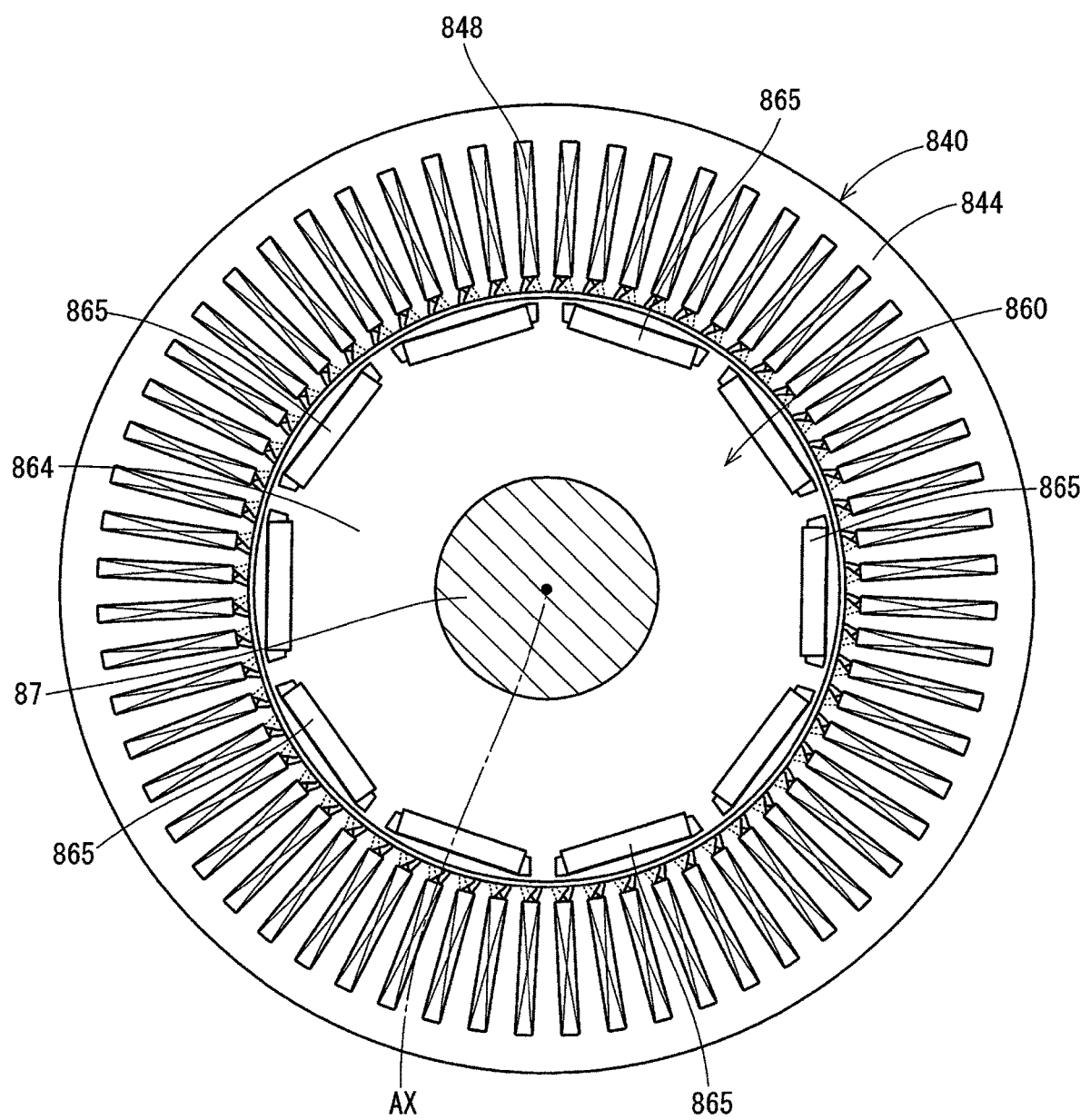
FIG. 4 is a sectional view taken along a line IV-IV of FIG. 2, illustrating an embedded magnet structure.
Figure 6:
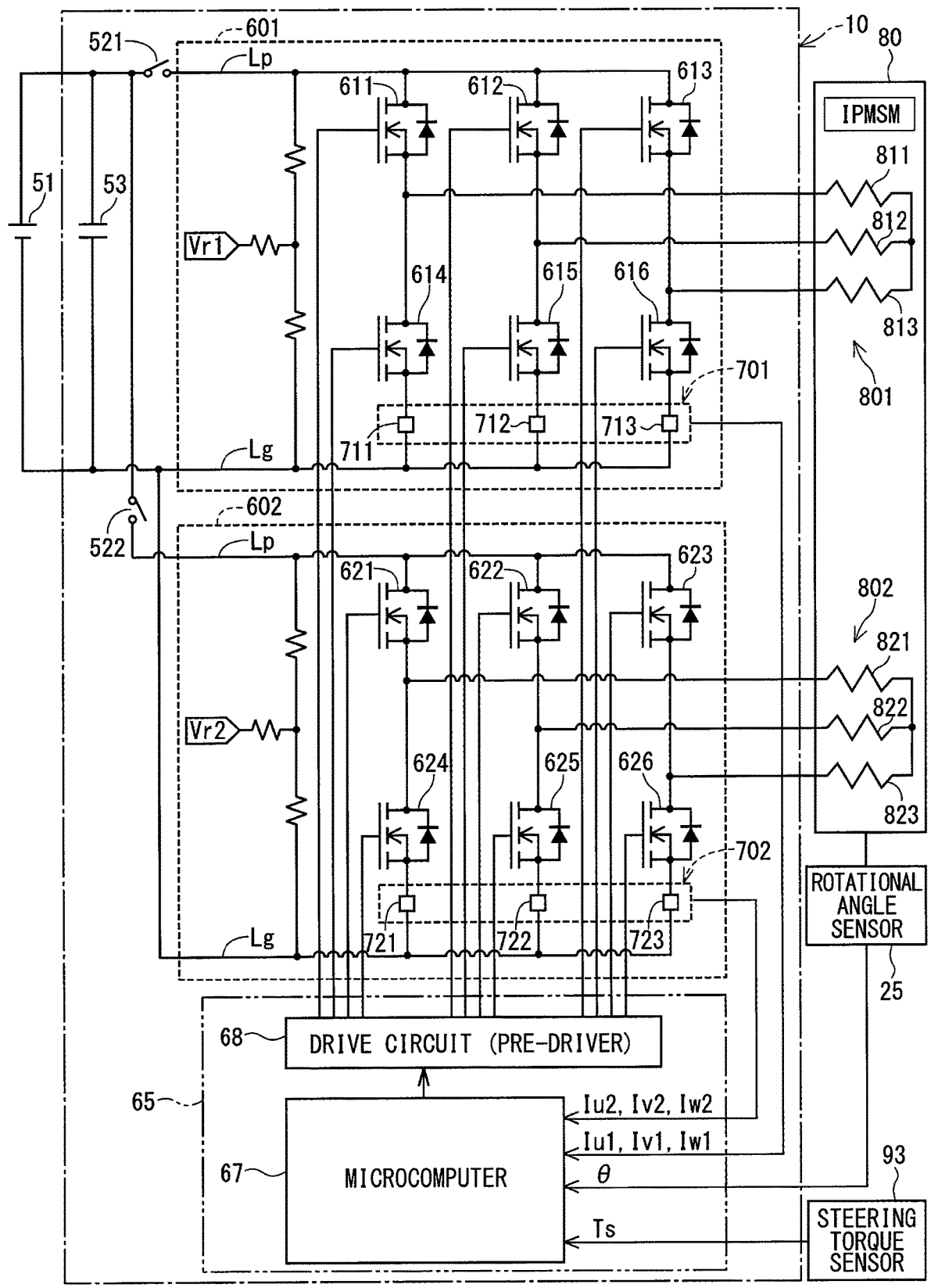
FIG. 6 is a diagram illustrating an overall configuration of a control device for a three-phase rotary machine.

Although two rotational angle sensors 251, 252, two microcomputers 671, 672, and the like are provided for the respective systems in the example of FIGS. 2 and 3, each of these may be provided as a common component for the two systems. In the case of FIG. 6, a conceivable configuration is such that a single rotational angle sensor 25 and a single microcomputer 67 are provided.

Figure 5:
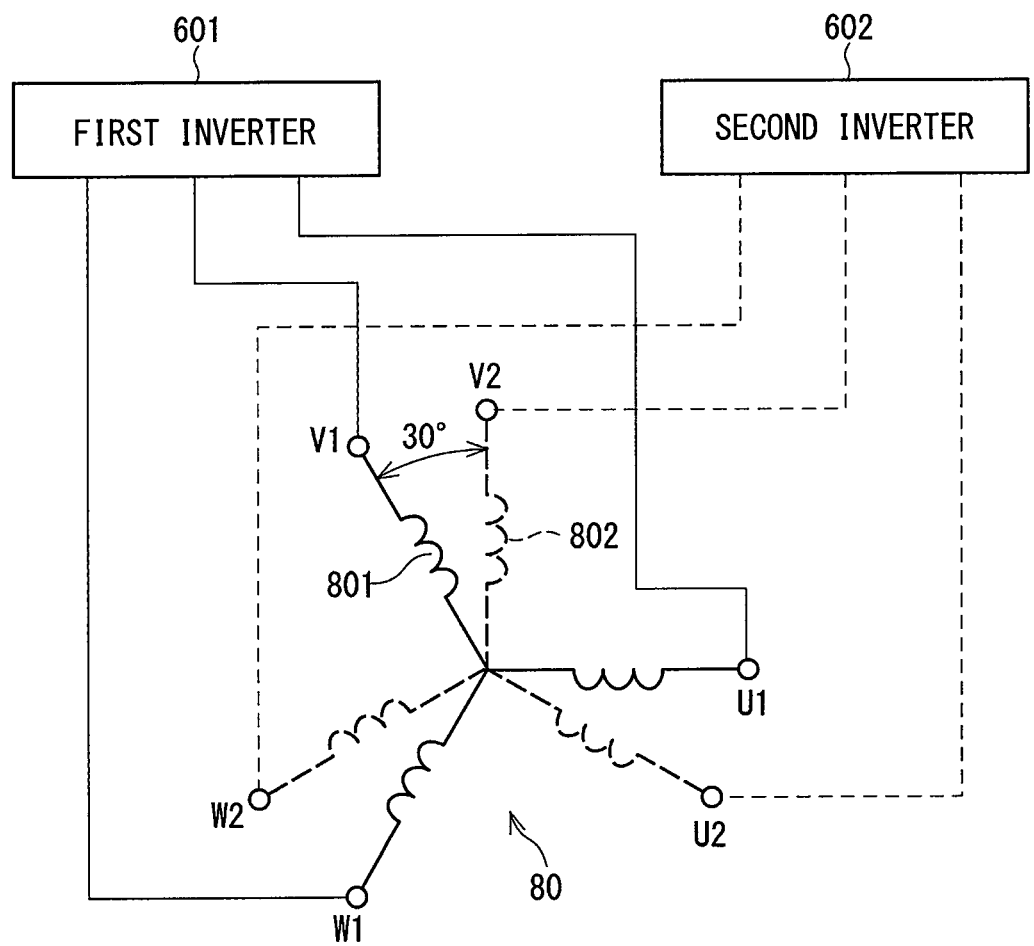
FIG. 5 is a schematic view illustrating a configuration of a two-system multi-phase coaxial motor.

As shown in FIGS. 5 and 6, the motor 80 to be controlled by the ECU 10 is a three-phase brushless motor in which two sets of three-phase-windings 801, 802 are provided coaxially. The winding sets 801, 802 have the same electrical characteristics and are disposed on the common stator 840 so that the winding sets 801, 802 differ from each other by an electrical angle of 30 degrees.

<Configuration of Control Device>

The overall configuration of the ECU 10 is shown in FIG. 6. The motor 80 acting as a three-phase rotary machine is a three-phase brushless motor including two sets of three-phase windings 801, 802 magnetically coupled to each other. The first winding set 801 is made up of U-phase, V-phase, and W-phase coils 811, 812, 813. The second winding set 802 is made up of U-phase, V-phase, and W-phase coils 821, 822, 823. The rotational angle sensor 25 detects an electrical angle $\theta$ of the motor 80 and outputs the electrical angle $\theta$ to a control unit 65.

Further, the motor 80 is an IPMSM, that is, an embedded magnet type synchronous rotary machine. Generally, an embedded magnet type rotary machine generates torque being a sum of magnet torque and reluctance torque, in other words, generates torque being a sum of magnet torque and reluctance torque. That is, it is premised in each embodiment that the ECU 10 controls driving of the motor 80 that generates torque being a sum of magnet torque and reluctance torque.

The ECU 10 acting as a control device includes inverters 601, 602 as power converters, current sensors 701, 702, a control unit 65, and the like. Hereinafter, units of the constituent element including a winding set and a corresponding inverter are referred to as a system. The first inverter 601 of the first system and the second inverter 602 of the second system are provided corresponding to the two winding sets 801, 802 and outputs, to the two winding sets 801, 802, alternating currents having the same amplitude and having a phase difference of $(30\pm60\times n)$ degrees where n is an integer.

In the inverters 601, 602, six switching elements 611 to 616 and six elements 621 to 626, which are, for example, metal-oxide-semiconductor field-effect transistor (MOSFETs), are bridge-connected between a high potential line Lp and a low potential line Lg, respectively. The inverters 601, 602 perform switching operation in accordance with a drive signal from a drive circuit 68 of the control unit 65, convert DC power of a battery 51, and supply the converted power to the two winding sets 801, 802. Power supply relays 521, 522 of the respective systems and a smoothing capacitor 53 are provided at input portions of the inverters 601, 602. Further, an input voltage can be detected by detecting divided voltages Vr1, Vr2.

The current sensors 701, 702 detect phase currents Iu1, Iv1, Iw1, Iu2, Iv2, Iw2 of the respective systems by current detection elements 711, 712, 713, 721, 722, 723, and provide feedback to the control unit 65. A suffix number 1 and 2 of a symbol representing a physical quantity such as current or voltage indicates that the physical quantity is of the first system or the second system.

The control unit 65 is made up of the microcomputer 67, a drive circuit (or pre-driver) 68, and the like and includes a central processing unit (CPU), a read-only memory (ROM), an input/output (I/O) (not shown), and a bus line connecting these constituents, and the like. The control unit 65 executes control by software processing performed by the CPU executing a program stored in advance in a tangible memory device (i.e., a readable non-transitory tangible storage medium) such as a ROM or hardware processing performed by a dedicated electronic circuit. The control unit 65 calculates a torque command based on the steering torque Ts detected by the steering torque sensor 93 and controls the energization of the motor 80 based on the torque command, feedback information of the phase currents Iu1, Iv1, Iw1, Iu2, Iv2, Iw2 and the electrical angle $\theta$, and the like.

Next, a configuration of the control unit 65 will be described with reference to FIG. 7. The control unit 65 includes a current command value addition/subtraction unit 41, a peak reduction current command value calculation unit 30, an addition/subtraction unit 38, a current feedback calculation unit 40, and the like. The control unit 65 performs feedback control on the sum and difference of the dq-axis actual currents flowing through the two sets of three-phase windings 801, 802 with respect to the sum and difference of the dq-axis current command values of the two systems. This method can simplify calculation as compared to a configuration in which feedback control is performed on a current command value for each system. It is noted that some of the following description alone may seem to overlap with the description of Patent Literature 1. However, these parts of the following description, when considered in combination with other parts of the following description, may not be the same as those in Patent Literature 1.

The current command value addition/subtraction unit 41 adds/subtracts current command values Id*, Iq* for the respective d-axis and q-axis, to generate Id sum* and Iq sum* which are the sums of the current command values, Id diff* and Iq diff* which are the differences of current command values. Since the electrical characteristics of the two systems are equivalent, Id sum* and Iq sum* correspond to twice Id* and twice Iq*, and Id diff* and Iq diff* correspond to 0. The current command value addition/subtraction unit 41 may not be provided, and Id sum*=2× Id*, Iq sum*=2×Iq*, Id diff*=0, Iq diff*=0 may be set.

The peak reduction current command value calculation unit 30 calculates, on the dq coordinates, a harmonic component to be superimposed on the phase current so as to reduce the peak of the phase current supplied to the two winding sets 801, 802 with respect to the peak of a first-order component. In the present embodiment, the peak reduction current command value calculation unit 30 generates, as harmonic components to be superimposed on the phase current, a fifth-order component having a frequency five times that of the phase current first-order component and a seventh-order component having a frequency seven times that of the phase current first-order component.

In response to this, the peak reduction current command value calculation unit 30 generates, as a harmonic component to be superimposed on a fundamental wave of a zeroth-order component on the dq coordinates, a dq-axis current of a sixth-order component having a frequency six times that of the phase current first-order component. The sixth-order component is an order component in the case of k=0 in 6(2k+1)th-order (k is an integer of 0 or larger) which is the generalized order. The detailed configuration of the peak reduction current command value calculation unit 30 will be described later.

Hereinafter, the sixth-order dq-axis current in the present disclosure means a current command value to be superimposed on the fundamental wave for the purpose of reducing the phase current peak. In principle, the amplitudes of the sixth-order d-axis currents with respect to the fundamental wave amplitude in the first and second systems are represented as $Id1_6^*$, $Id2_6^*$, and the current difference between the two systems is represented as Id $diff_6^*$. Similarly, in principle, the amplitudes of the sixth-order d-axis currents with respect to the fundamental wave amplitude in the first and second systems are represented as $Iq1_6^*$, $Iq2_6^*$, and the current difference between the two systems is represented as Iq $diff_6^*$.

It is noted that in the below-description, a symbol * is omitted from the reference to the sixth-order dq amplitude ratio (i.e., the ratio of the amplitude of the sixth-order d-axis current to the amplitude of the sixth-order q-axis current), and thus the used reference is ($Id_6/Iq_6$). In addition, the symbol * may be omitted as appropriate for the sixth-order d-axis current and the sixth-order q-axis current related to the sixth-order dq amplitude ratio. Further, in mathematical formula showing the relationship between the torque and the current, or the like, it is irrelevant to whether the current is a command value or an actual value, so that the symbol * is omitted for both zeroth-order dq-axis currents $Id_0$, $Iq_0$ and sixth-order dq-axis currents $Id_6$, $Iq_6$.

The sixth-order dq-axis currents $Id1_6^*$, $Id2_6^*$, $Iq1_6^*$, $Iq2_6^*$ calculated for the respective systems by the peak reduction current command value calculation unit 30 are added/subtracted by the addition/subtraction unit 38 for the respective d-axis and q-axis. The sum of the sixth-order components of the two systems with the current phase shifted by 30 degrees is offset, so that Id $sum_6^*$ and Iq $sum_6^*$ become 0.

In the present embodiment, the amplitudes of the sixth-order q-axis currents $Iq1_6^*$, $Iq2_6^*$ are set to be equal to or greater than the amplitudes of the sixth-order d-axis currents $Id1_6^*$, $Id2_6^*$. In some cases, the amplitudes of the sixth-order q-axis currents $Iq1_6^*$, $Iq2_6^*$ are set to positive values, and the amplitudes of the sixth-order d-axis currents $Id1_6^*$, $Id2_6^*$ are set to zero. In another case, the amplitudes of the sixth-order q-axis currents $Iq1_6^*$, $Iq2_6^*$ and the amplitudes of the sixth-order d-axis currents $Id1_6^*$, $Id2_6^*$ may be set to positive values equal to each other.

Id $diff_6^*$ and Iq $diff_6^*$ calculated by the addition/subtraction unit 38 are respectively added to Id diff* between the d-axis current command values of the two systems and Iq diff* between the q-axis current command values of the two systems, calculated by the current command value addition/subtraction unit 41, that is, added to 0. Thus, Id sum* and Iq sum* calculated by the current command value addition/subtraction unit 41 are output to the current feedback calculation unit 40 as they are. Further, Id $diff_6^*$ and Iq $diff_6^*$ are added to Id diff* and Iq diff*, which are output to the current feedback calculation unit 40.

The current feedback calculation unit 40 includes a sum controller 421, a difference controller 422, a two-system voltage calculation unit 43, and a feedback current addition/subtraction unit 46. In the present description, a portion that performs feedback calculation based on a deviation between a command value and an actual value is defined as a current feedback calculation unit. Therefore, coordinate conversion units 441, 442, 451, 452 before and after the feedback calculation are illustrated outside the frame of the current feedback calculation unit.

The sum controller 421 receives inputs of the deviations between Id sum*/Iq sum* and Id sum/Iq sum calculated by the feedback current addition/subtraction unit 46. The sum controller 421 calculates Vd sum and Vq sum, which are the sums of voltage command values of the two systems, by proportional integral control calculation so as to converge the deviations to zero.

The difference controller 422 receives inputs of Id diff* (=0), a value obtained by adding Iq $diff_6^*$ to Iq diff*(=0), and the deviation between Id diff and Iq diff calculated by the feedback current addition/subtraction unit 46. The difference controller 422 calculates Vd diff and Vq diff, which are the differences of voltage command values of the two systems, by proportional integral control calculation so as to converge the deviations to zero.

Figure 7:
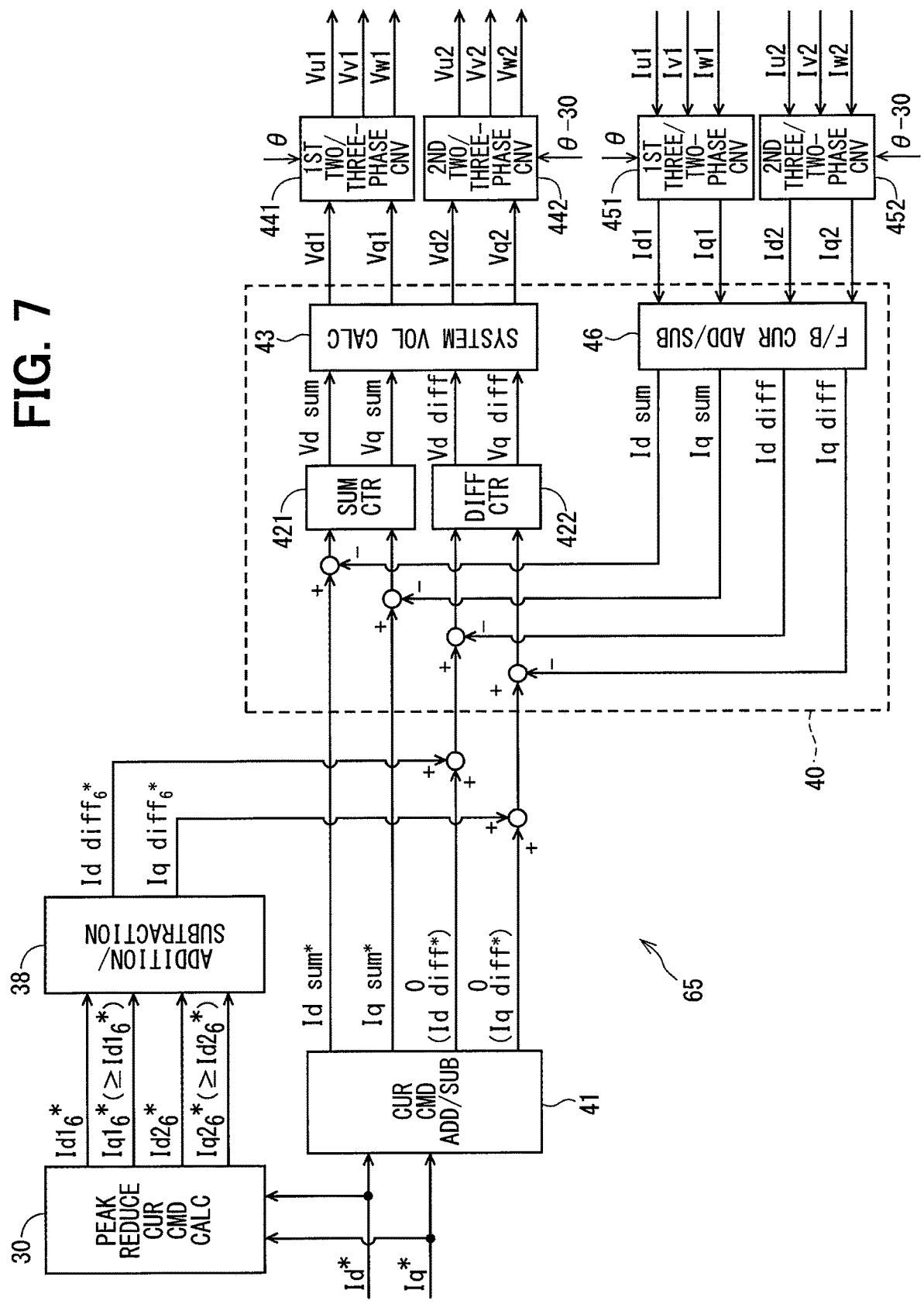
FIG. 7 is a block diagram illustrating a control unit according to one embodiment.

In the coordinate conversion units 441, 442, 451, 452 of FIG. 7, the reference "first" is added to the control block of the first system, and the reference "second" is added to the control block of the second system. However, the functions of the respective control blocks of the two systems are basically the same, and hence the reference "first" and "second" may be omitted when appropriate and their description may be provided at once. In coordinate conversion calculation, the calculation is performed using the reference θ as the electrical angle in the first system and using the reference θ−30 with the 30 degrees phase shift in the second system. Herein, the unit of θ is degree(s).

The system voltage calculation unit 43 converts Vd sum, Vq sum, Vd diff, and Vq diff to voltage command values Vd1, Vq1, Vd2, Vq2 of the first and second systems and outputs the converted values to a two-phase/three-phase conversion units 441, 442. The two-phase/three-phase conversion units 441, 442 coordinate-convert the dq-axis voltage command values Vd1, Vq1, Vd2, Vq2 to three-phase voltage command values Vu1, Vv1, Vw1, Vu2, Vv2, Vw2. Thereafter, based on the three-phase voltage command values Vu1, Vv1, Vw1, Vu2, Vv2, Vw2, drive signals for the inverters 601, 602 are generated by pulse width modulation (PWM) control or the like.

The three-phase/two-phase conversion units 451, 452 perform coordinate-transformation of actual currents Iu1, Iv1, Iw1, Iu2, Iv2, Iw2 detected by the current sensors into dq-axis currents Id1, Iq1, Id2, Iq2 and feedback the coordinate-transformed values. The feedback current addition/subtraction unit 46 adds/subtracts the current detection values Id1, Iq1, Id2, Iq2 input from the three-phase/two-phase conversion units 451, 452 to calculate Id sum, Iq sum, Id diff, Iq diff.

Figure 8:
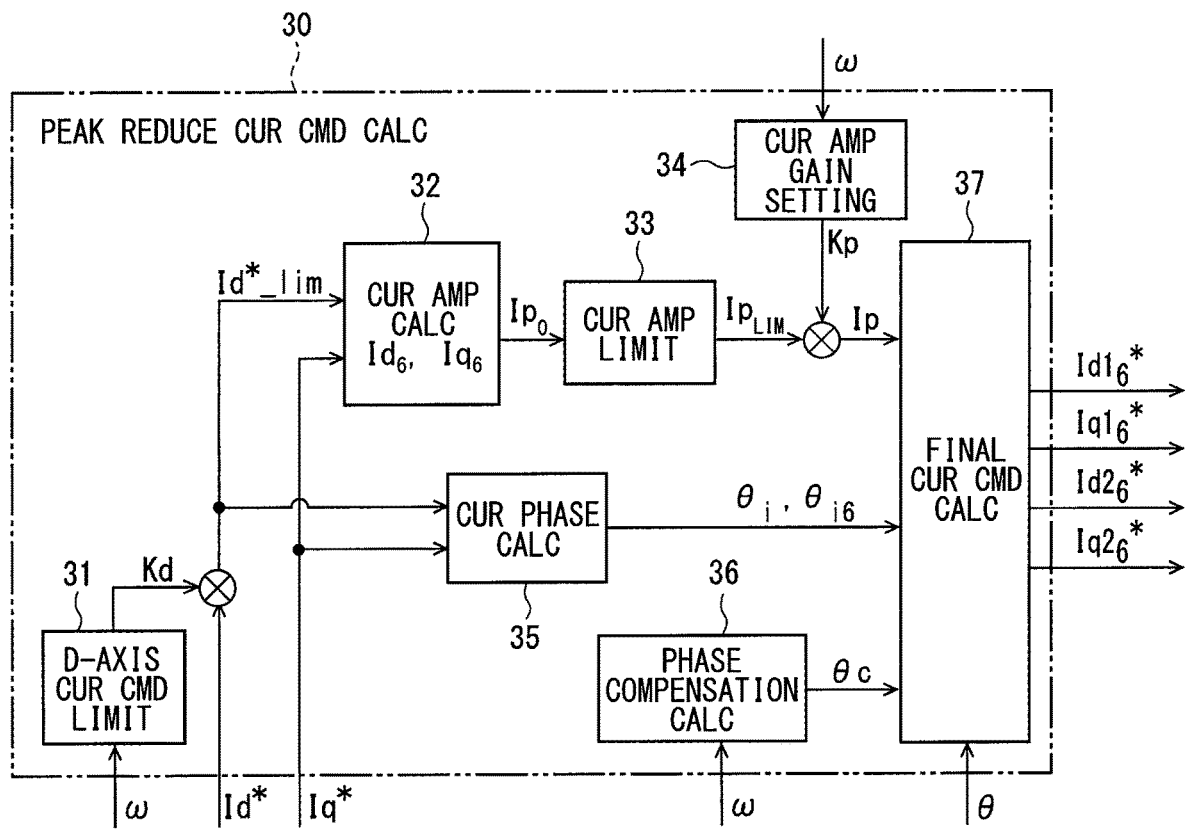
FIG. 8 is a block diagram illustrating a peak reduction current command value calculation unit of FIG. 7.

Subsequently, a configuration of the peak reduction current command value calculation unit 30 common to each embodiment will be described with reference to FIGS. 8 to 13. As shown in FIG. 8, the peak reduction current command value calculation unit 30 includes a d-axis current command value limiting unit 31, a current amplitude calculation unit 32, a current amplitude limiting unit 33, a current amplitude gain setting unit 34, a current phase calculation unit 35, a phase compensation amount calculation unit 36, and a final current command value calculation unit 37.

The peak reduction current command value calculation unit 30 calculates sixth-order dq-axis currents $Id1_6^*$, $Id2_6^*$, $Iq1_6^*$, $Iq2_6^*$ as peak reduction current command values based on the dq-axis current command values Id*, Iq*. By reducing the phase current peak, it is possible to reduce the heat generation of the inverters 601, 602 and the winding sets 801, 802 in particular at the time when the motor 80 has zero velocity and low rotation.

The peak reduction current command value calculation unit 30 receives inputs of an electrical angle θ detected by the rotational angle sensor 25 and an electrical angular velocity ω obtained by temporally differentiating the electrical angle θ, in addition to the dq-axis current command values Id*, Iq*. The electrical angular velocity ω is converted to the motor rotational speed rpm (revolution per minute) by multiplying the proportional constant. In the following description and drawings, the rotational speed obtained by converting the electrical angular velocity ω is omitted to be appropriately described as a rotational speed ω. Further, the positive and negative of the rotational speed w reflect the positive and negative of the electrical angle θ, that is, the rotational direction of the motor 80. The peak reduction current command value calculation unit 30 calculates the dq-axis current of the sixth-order component on the dq coordinates so as to reduce the phase current peak.

Next, the calculation in each block will be described. The calculation of each block may be performed by reference to a map or may be performed by arithmetic calculation.

Figure 9:
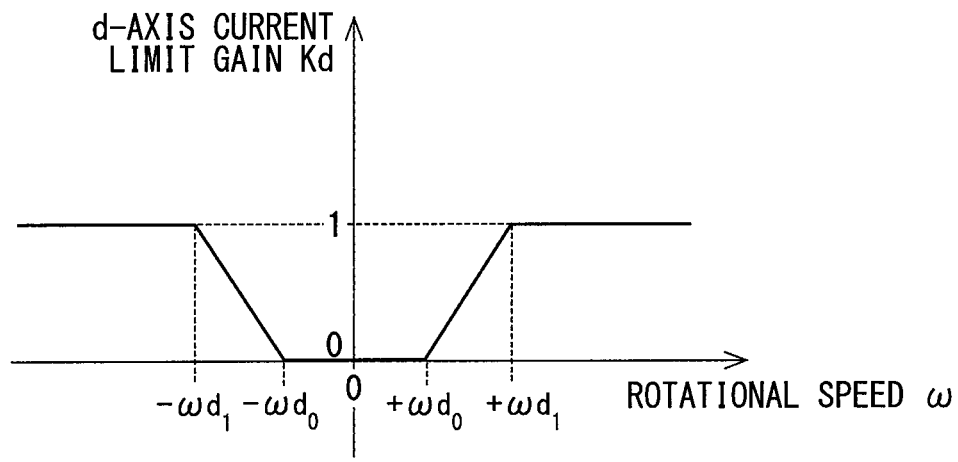
FIG. 9 is a diagram illustrating a relationship between a rotational speed of a three-phase rotary machine and a d-axis current limiting gain.

The d-axis current command value limiting unit 31 limits the d-axis current command value Id* in accordance with the rotational speed w of the motor 80 and outputs the limited value as a d-axis current command limit value Id*_lim. Specifically, as shown in FIG. 9, when the absolute value of the rotational speed ω is $\omega d_1$ or larger, the d-axis current command value Id* is multiplied by 1 serving as a d-axis current limiting gain Kd. When the absolute value of the rotational speed ω is smaller than $\omega d_0$, the d-axis current command value Id* is multiplied by 0 serving as the d-axis current limiting gain Kd. The gain Kd is gradually increased from 0 to 1 when the absolute value of the rotational speed ω is from $\omega d_0$ to $\omega d_1$.

That is, when the absolute value of the rotational speed ω is $\omega d_1$ or larger, the d-axis current command value Id* is maintained as it is, and when the absolute value of the rotational speed ω is smaller than $\omega d_0$, the d-axis current command value Id* is set to 0 and a current phase $\theta_i$ is fixed at 0 degree. In addition, when the absolute value of the rotational speed ω is in a range from $\omega d_0$ to $\omega d_1$, the d-axis current command value Id* is the gradually-variable value from 0 to 1. As a result, in a low rotational speed region where the absolute value of the rotational speed ω is smaller than $\omega d_0$, the calculation of the zeroth-order dq-axis current phase $\theta_i$ is omittable. Here, the current phase $\theta_i$ corresponds to an angle with reference to a +q-axis of a current vector with Id* and Iq* taken as d-axis and q-axis components, respectively, on the dq-axis coordinates. The current phase $\theta_i$ is defined with the counterclockwise direction from the +q-axis as positive.

The current amplitude calculator unit 32 calculates an amplitude $Id_6^*$ of the d-axis current of the sixth-order component and an amplitude $Iq_6^*$ of the q-axis current of the sixth-order component, which are superimposed on the fundamental wave component, based on the dq-axis current command values Id*, Iq*. Further, the current amplitude calculation unit 32 calculates a current amplitude reference value $Ip_0$ $(=\sqrt{(Id_6^{*2}+Iq_6^{*2})})$ of the sixth-order component. The amplitude $Id_6^*$ of the d-axis current of the sixth-order component and the amplitude $Iq_6^*$ of the q-axis current of the sixth-order component are calculated differently depending on the following cases in accordance with the relationship between the fundamental wave amplitude $\sqrt{(Id^{*2}+Iq^{*2})}$ of the dq current command values Id*, Iq* and a predetermined value X. Technical significance of the predetermined value X will be described later.

Here, the ratio of the amplitude $Id_6$ of the sixth-order d-axis current to the amplitude $Iq_6$ of the sixth-order q-axis current is defined as a sixth-order dq amplitude ratio ($Id_6/Iq_6$). As described above, the symbol * of $Id_6^*$, $Iq_6^*$ are omitted and $Id_6$, $Iq_6$ are used as the references to the sixth-order d-axis current and the sixth-order q-axis current related to the sixth-order dq amplitude ratio. The generalized ratio of the amplitude of the d-axis current of the 6(2k+1)th component to the amplitude of the q-axis current of the 6(2k+1)th component is referred to as a high-order dq amplitude ratio. The sixth-order dq amplitude ratio corresponds to the high-order dq amplitude ratio in the case of k=0.

When $\sqrt{(Id^{*2}+Iq^{*2})} \leq X$, the amplitudes $Id_6$, $Iq_6$ of the sixth-order d-axis current and the sixth-order q-axis current are calculated using Equations (1.1) and (1.2). At this time, the sixth-order dq amplitude ratio ($Id_6/Iq_6$) is zero.

$$Id_6 = 0 \tag{1.1}$$

$$Iq_6 = 0.044 \times \sqrt{(3/2)} \times \sqrt{(Id^{*2}+Iq^{*2})} \tag{1.2}$$

When $\sqrt{(Id^{*2}+Iq^{*2})} > X$, the amplitudes $Id_6$, $Iq_6$ of the sixth-order d-axis current and the sixth-order q-axis current are calculated using Equations (1.3) and (1.4). At this time, the sixth-order dq amplitude ratio ($Id_6/Iq_6$) is 1.

$$Id_6 = 0.044 \times \sqrt{(3/2)} \times \sqrt{(Id^{*2}+Iq^{*2})} \tag{1.3}$$

$$Iq_6 = 0.044 \times \sqrt{(3/2)} \times \sqrt{(Id^{*2}+Iq^{*2})} \tag{1.4}$$

Figure 10:
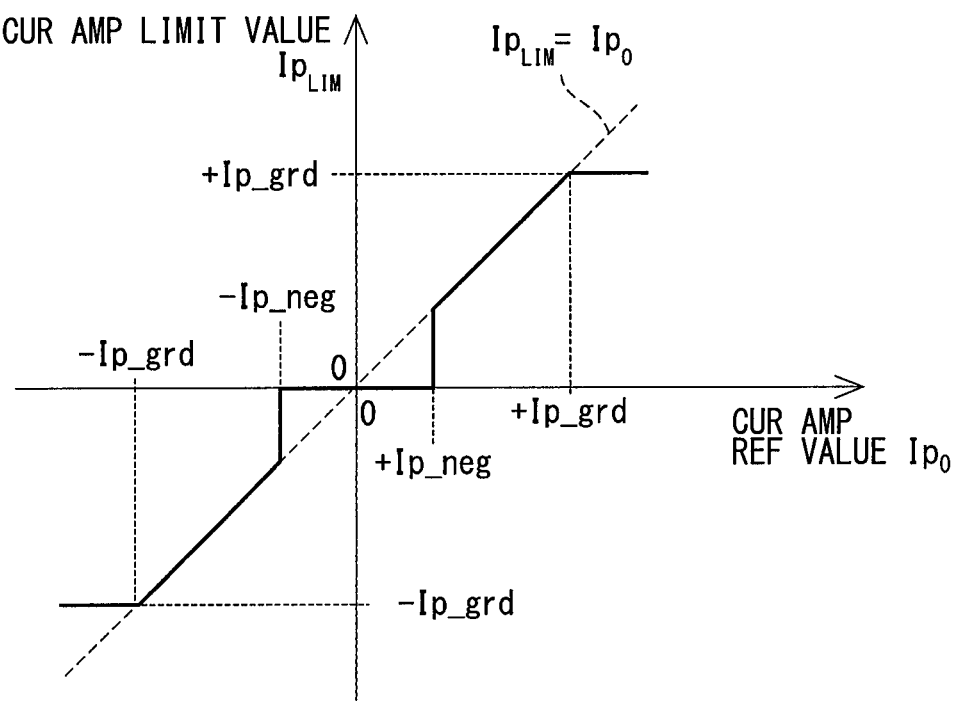
FIG. 10 is a diagram illustrating a relationship between a current amplitude reference value and a current amplitude limit value.

The current amplitude limiting unit 33 limits the value of the current amplitude reference value $Ip_0$ and outputs the limited value as a current amplitude limit value $Ip_{LIM}$. Specifically, as shown in FIG. 10, when the absolute value of the current amplitude reference value $Ip_0$ is not smaller than Ip_neg and not larger than 1p_grd, the current amplitude reference value $Ip_0$ is maintained as it is. On the other hand, when the absolute value of the current amplitude reference value $Ip_0$ is smaller than Ip_neg, the current amplitude limit value $Ip_{LIM}$ is set to zero. In addition, when the absolute value of the current amplitude reference value $Ip_0$ exceeds 1p_grd, the current amplitude limit value $Ip_{LIM}$ is limited to a guard value±1p_grd.

When the absolute value of the current amplitude reference value $Ip_0$ is smaller than Ip_neg, the peak of the phase current first-order component is relatively low, and heat generation may not matter and there may be little need to reduce the peak. Therefore, the calculation of the peak reduction current command value is omittable by setting the current amplitude limit value $Ip_{LIM}$ to zero and setting the peak reduction current command value output from the peak reduction current command value calculation unit 30 to zero.

The current amplitude gain setting unit 34 sets the current amplitude gain Kp in accordance with the rotational speed ω of the motor 80. The current amplitude Ip obtained by multiplying the current amplitude limit value $Ip_{LIM}$ output from the current amplitude limiting unit 33 by the current amplitude gain Kp is output to the final current command value calculation unit 37.

Figure 11A:
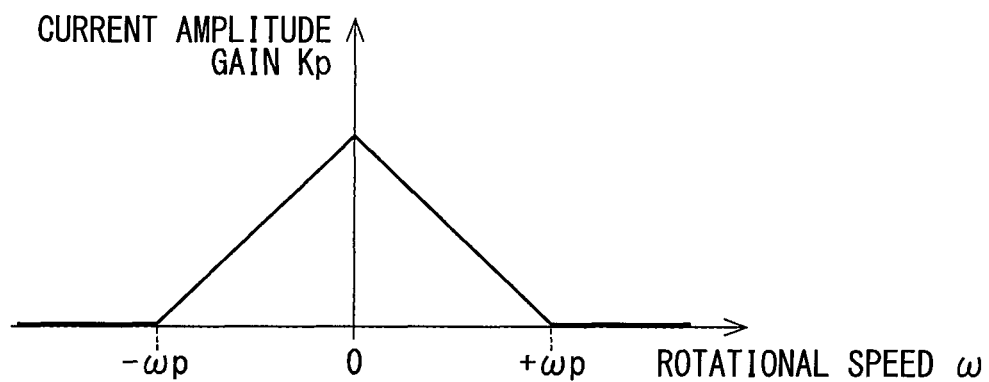
FIG. 11A is a diagram illustrating a relationship between a rotational speed of a three-phase rotary machine and a current amplitude gain.
Figure 11B:
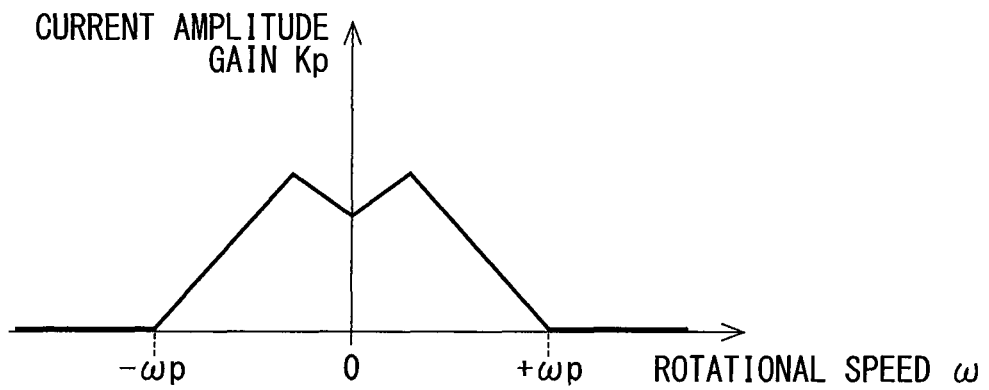
FIG. 11B is a diagram illustrating another relationship between a rotational speed of a three-phase rotary machine and a current amplitude gain.

As shown in FIGS. 11A and 11B, when the absolute value of the rotational speed ω is larger than ωp, the current amplitude gain Kp is set to 0. That is, in a high rotational speed region where the absolute value of the rotational speed ω is larger than ωp, the peak reduction current command value is set to 0, and energization for reducing the phase current peak is not performed. Therefore, assuming that the relationship between a rotational speed threshold ωp of the current amplitude gain setting unit 34 and a rotational speed threshold $ωd_0$ of the d-axis current command value limiting unit 31 is $ωd_0≥ωp$, the calculation of the current phase $θ_i$ is omittable in all rotational speed regions.

On the other hand, when the absolute value of the rotational speed ω is equal to or smaller than ωp as shown in FIG. 11A, the current amplitude gain Kp is set so as to increase linearly as the rotational speed ω approaches zero. Further, as shown in FIG. 11B, the current amplitude gain Kp is set so as to make correction for the amplitude reduction that occurs with response delay in the current control. For example, the current amplitude gain Kp is set so as to increase as the absolute value of the rotational speed ω decreases from ωp, and to decrease again near the absolute value of the rotational speed ω near zero. In this configuration, the harmonic components are superimposed when the influence of the peak value on the heat generation is large, e.g., when the motor 80 has zero velocity and low rotation, but the harmonic components are not superimposed at the high rotation while the influence of the effective value on the heat generation is large. This realizes appropriate control based on the needs.

When the relationship between the rotational speed threshold ωp of the current amplitude gain setting unit 34 and the rotational speed threshold $ωd_0$ of the d-axis current command value limiting unit 31 is $ωd_0<ωp$, the current phase calculation unit 35 calculates the zeroth-order dq-axis current phase $θ_i$ and the sixth-order dq-axis current phase $θ_{i6}$ in the region where the absolute value of the rotational speed ω is $ωd_0<|ω|<ωp$, based on the dq-axis current command values Id*, Iq*. Then, the current phase calculation unit 35 outputs the calculated phases to the final current command value calculation unit 37.

The zeroth-order dq-axis current phase $θ_i$: (−180 degrees<$θ_i$≤180 degrees), is calculated using Equations (2.1) to (2.5) in accordance with the positive/negative of Id*, Iq*.

Where Iq*>0, $$θ_i = \tan^{-1}(-Id^*/Iq^*) \quad (2.1)$$

Where Id*>0 and Iq*=0, $$θ_i = -90 \text{ degrees} \quad (2.2)$$

Where Id*<0, Iq*=0, $$θ_i = 90 \text{ degrees} \quad (2.3)$$

Where Id*>0, Iq*<0, $$θ_i = -180 - \tan^{-1}(Id^*/Iq^*) \quad (2.4)$$

Where Id*≤0 and Iq*<0, $$θ_i = 180 - \tan^{-1}(Id^*/Iq^*) \quad (2.5)$$

Similarly to the zeroth-order dq-axis current phase $θ_i$, the value of the sixth-order dq-axis current phase $θ_{i6}$ measured in the counterclockwise direction from the +q-axis is defined as positive value The sixth-order dq-axis current phase $θ_{i6}$ is calculated differently depending on the following cases in accordance with the relationship between the fundamental wave amplitude $\sqrt{(Id^{*2}+Iq^{*2})}$ of the dq current command values Id*, Iq* and the predetermined value X.

Figure 12A:
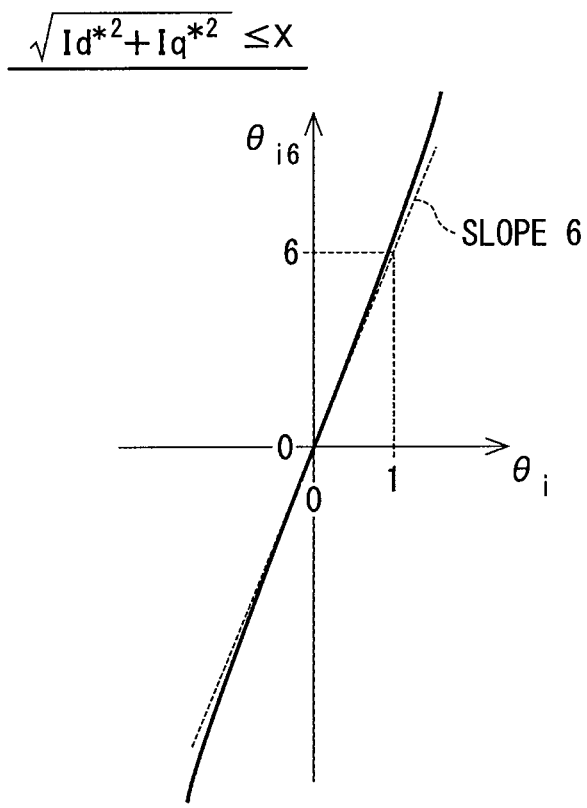
FIG. 12A is a map defining a relationship between a zeroth-order current dq-axis current phase $\theta_i$ and a sixth-order dq-axis current phase $\theta_{i6}$.

When $\sqrt{(Id^{*2}+Iq^{*2})}≤X$, the sixth-order dq-axis current phase $θ_{i6}$ is calculated using the formula $θ_{i6}=6θ_i$ or a map of FIG. 12A. In the map of FIG. 12A, $(θ_{i6}/θ_i)=6$ in the range where $|θ_i|$ is smaller than or equal to the predetermined value, and $(θ_{i6}/θ_i)>6$ when $|θ_i|$ becomes larger than the predetermined value.

Figure 12B:
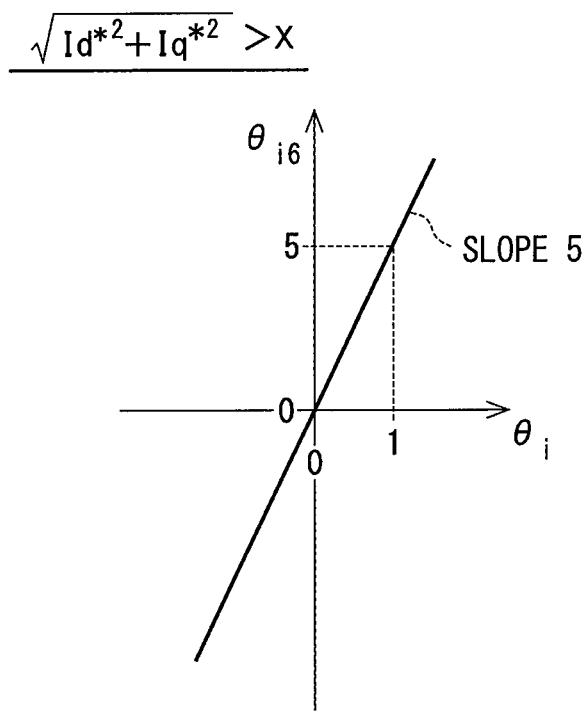
FIG. 12B is another map defining a relationship between a zeroth-order current dq-axis current phase $\theta_i$ and a sixth-order dq-axis current phase $\theta_{i6}$.

When $\sqrt{(Id^{*2}+Iq^{*2})}>X$, the sixth-order dq-axis current phase $θ_{i6}$ is calculated using the formula $θ_{i6}=5θ_i$ or the map of FIG. 12B. In the map of FIG. 12B, $(θ_{i6}/θ_i)=5$ is constant regardless of the value of $|θ_i|$.

Figure 13:
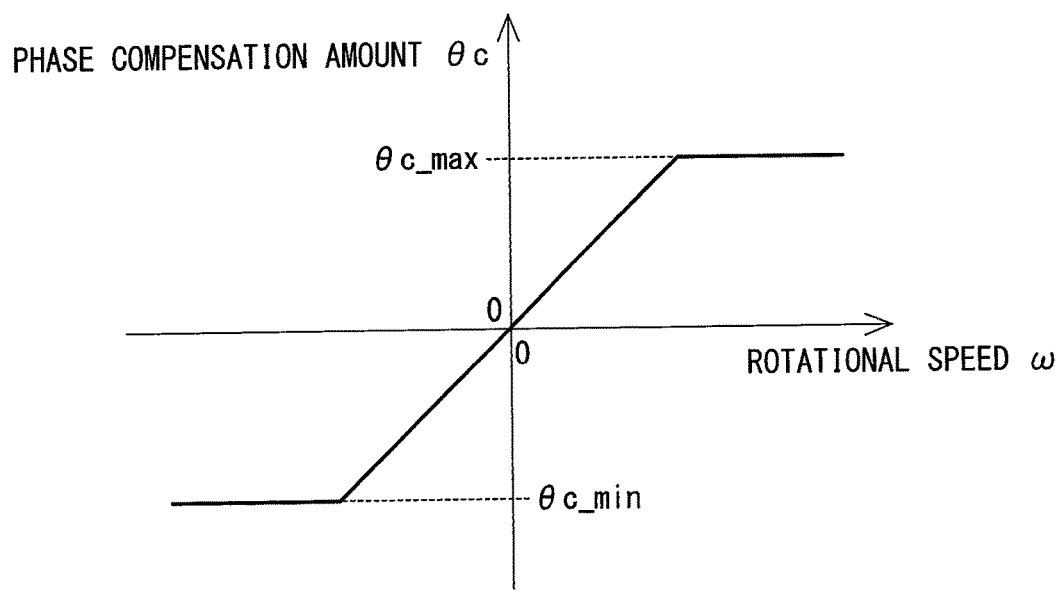
FIG. 13 is a diagram illustrating a relationship between a rotational speed of a three-phase rotary machine and a phase compensation amount.

The phase compensation amount calculation unit 36 calculates a phase compensation amount θc according to the rotational speed ω of the motor 80. The higher the rotational speed ω, the higher the frequency of the current to be energized. Accordingly, it is required to compensate for the phase delay that occurs with the response delay of the current control. Thus, as shown in FIG. 13, the phase compensation amount calculation unit 36 calculates a phase compensation amount θc having a positive correlation between the lower limit value θc_min and the upper limit value θc_max in accordance with the rotational speed ω to output the calculated amount to the final current command value calculation unit 37.

The final current command value calculation unit 37 receives inputs of a current amplitude Ip, the phase compensation amount θc, and in some cases, the dq-axis current phase $θ_i$, and the zeroth and sixth-order dq-axis current phases Bis. Further, the final current command value calculation unit 37 obtains the electrical angle θ from the rotational angle sensor 25, and calculates sixth-order dq-axis currents $Id1_6^*$, $Id2_6^*$, $Iq1_6^*$, $Iq2_6^*$. In the configuration in which the addition/subtraction unit 38 is not provided, the final current command value calculation unit 37 calculates an Id $diff_6^*$ and an Iq $diff_6^*$ which are differences between the sixth-order dq-axis currents of the two systems.

Next, description will be given of the relationship between the amplitudes of the sixth-order d-axis current $Id_6$ and the sixth-order q-axis current $Iq_6$ and torque Tm of the motor 80. The torque Tm of the motor, which motor generates the torque being a sum of the magnet torque and the reluctance torque, is expressed by Equation (3). Here, Kt represents a magnet torque constant, and Ld and Lq represent d-axis inductance and q-axis inductance. Generally, in the embedded magnet type rotary machine, since Ld≠Lq, reluctance torque is generated according to the second term of the right side of Equation (3).

$$Tm = Kt \times Iq + (Ld - Lq) \times Id \times Iq \quad (3)$$

Next, the configuration for superimposing the sixth-order dq-axis current on the fundamental wave of the zeroth-order component on the dq coordinates is applied to the currents supplied to the winding sets 801, 802 of the two systems having the positional relationship providing the electrical angle difference of 30 degrees. When it is premised that the two systems are normal, the two systems have the same amplitudes of the alternating currents output from the two systems of inverters 601, 602, and have the phase difference of 30 degrees.

A first system d-axis magnetic flux $\phi d1$, a first system q-axis magnetic flux $\phi q1$, a d-axis torque constant Ktd and a q-axis torque constant Ktq are expressed by Equations (4.1) to (4.4). In the following, subscripts $_0$ and $_6$ are attached to the end of the references to indicate the zeroth-order component and the sixth-order component, respectively.

<Mathematical Formula 1>

$$\Phi d1 = Ktd + (Ld \times Id1) + (Md \times Id2) \quad (4.1)$$

$$\Phi q1 = Ktq + (Lq \times Iq1) + (Md \times Iq2) \quad (4.2)$$

$$Ktd = Kt_0 + Ktd_6 \cos(6\theta) \quad (4.3)$$

$$Ktq = Ktq_6 \sin(6\theta) \quad (4.4)$$

Further, the dq-axis currents Id1, Iq1, Id2, Iq2 of the respective systems are expressed by Equations (5.1) to (5.4) by the zeroth-order component and the sixth-order component, respectively.

<Mathematical Formula 2>

$$Id1 = Id1_0 - Id1_6 \cos(6\theta) \quad (5.1)$$

$$Iq1 = Iq1_0 + Iq1_6 \sin(6\theta) \quad (5.2)$$

$$Id2 = Id2_0 + Id2_6 \cos(6\theta) \quad (5.3)$$

$$Iq2 = Iq2_0 - Iq2_6 \sin(6\theta) \quad (5.4)$$

Based on the above, a winding torque Tm1 of the first system and a winding torque Tm2 of the second system are expressed by Equations (6.1) and (6.2).

< Mathematical Formula 3>

$$\begin{aligned} Tm1 = &(Kt_0 + Ktd_6\cos(6\theta)) \times (Iq1_0 + Iq1_6\sin(6\theta)) - \\ & Ktq_6\sin(6\theta) \times (Id1_0 - Id1_6\cos(6\theta)) + \\ & (Ld - Lq) \times (Id1_0 - Id1_6\cos(6\theta)) \times (Iq1_0 + Iq1_6\sin(6\theta)) + \\ & Md \times (Id2_0 + Id2_6\cos(6\theta)) \times (Iq1_0 + Iq1_6\sin(6\theta)) - \\ & Mq \times (Iq2_0 - Iq2_6\sin(6\theta)) \times (Id1_0 - Id1_6\cos(6\theta)) \end{aligned} \quad (6.1)$$

< Mathematical Formula 4>

$$\begin{aligned} Tm2 = &(Kt_0 + Ktd_6\cos(6\theta)) \times (Iq2_0 - Iq2_6\sin(6\theta)) + \\ & Ktq_6\sin(6\theta) \times (Id2_0 + Id2_6\cos(6\theta)) + \\ & (Ld - Lq) \times (Id2_0 + Id2_6\cos(6\theta)) \times (Iq2_0 - Iq2_6\sin(6\theta)) + \\ & Md \times (Id1_0 - Id1_6\cos(6\theta)) \times (Iq2_0 - Iq2_6\sin(6\theta)) - \\ & Mq \times (Iq1_0 + Iq1_6\sin(6\theta)) \times (Id2_0 + Id2_6\cos(6\theta)) \end{aligned} \quad (6.2)$$

Since the electrical characteristics of the two systems are equivalent, zeroth-order dq-axis currents $Id_0$, $Iq_0$ and sixth-order dq-axis currents $Id_6$, $Iq_6$ common to the two systems are defined as follows using Equations (7.1) to (7.4).

$$Id_6 = Id1_0 = Id2_0 \quad (7.1)$$

$$Iq_0 = Iq1_0 = Iq2_0 \quad (7.2)$$

$$Id_6 = Id1_6 = Id2_6 \quad (7.3)$$

$$Iq_6 = Iq1_6 = Iq2_6 \quad (7.4)$$

When both sides of Equations (6.1) and (6.2) are combined using Equations (7.1) to (7.4), the total winding torque Tm of the two systems is expressed by Equation (8).

<Mathematical Formula 5>

$$\begin{aligned} Tm = Tm1 + Tm2 = &2Kt_0 \times Iq_0 + \\ & Ktd_6\cos(6\theta) \times 2Iq_6\sin(6\theta) + Ktq_6\sin(6\theta) \times 2Id_6\cos(6\theta) + \\ & (Ld - Lq) \times (2Id_0 \times Iq_0) + (Md - Mq) \times (2Id_0 \times Iq_0) - \\ & (Ld - Lq) \times (2Id_6\cos(6\theta) \times Iq_6\sin(6\theta)) - \\ & (Md - Mq) \times (2Id_6\cos(6\theta) \times Iq_6\sin(6\theta)) \end{aligned} \quad (8)$$

In Equation (8), when the terms including the zeroth-order components $Id_0$, $Iq_0$ are deleted, the sixth-order component $Tm_6$ of the torque resulting from the sixth-order components $Id_6$, $Iq_6$ is expressed by Equation (9).

<Mathematical Formula 6>

$$\begin{aligned} Tm_6 = &Ktd_6\cos(6\theta) \times 2Iq_6\sin(6\theta) + Ktq_6\sin(6\theta) \times 2Id_6\cos(6\theta) - \\ & (Ld - Lq) \times (Id_6 \times Iq_6) \times (2\cos(6\theta)\sin(6\theta)) - \\ & (Md - Mq) \times (Id_6 \times Iq_6) \times (2\cos(6\theta)\sin(6\theta)) \end{aligned} \quad (9)$$

Further, dq-axis sixth-order torque constants $Ktd_6$, $Ktq_6$ are expressed by Equations (10.1) and (10.2) using fifth-order and seventh-order torque constants $Kt_5$, $Kt_7$. Thus, the first line of Equation (9) is rewritten as Equation (10.3).

$$Ktd_6 = Kt_5 - Kt_7 \quad (10.1)$$

$$Ktq_6 = -Kt_5 - Kt_7 \quad (10.2)$$

<Mathematical 7>

$$\begin{aligned} Ktd_6\cos(6\theta) \times 2Iq_6\sin(6\theta) + Ktq_6\sin(6\theta) \times 2Id_6\cos(6\theta) = \\ (Kt_5 - Kt_7)\cos(6\theta) \times 2Iq_6\sin(6\theta) + \\ (Kt_5 + Kt_7)\sin(6\theta) \times 2Id_6\cos(6\theta) = \\ \{Kt_5 \times (Iq_6 - Id_6) - Kt_7 \times (Iq_6 + Id_6)\} \times 2\sin(6\theta)\cos(6\theta) \end{aligned} \quad (10.3)$$

Here, there is the relation of $2\sin(6\theta)\cos(6\theta) = \sin(12\theta)$ and the maximum value of $\sin(12\theta)$ is 1. The peak-to-peak amplitude is 2. Therefore, when peak-to-peak amplitude of the sixth-order torque component $Tm_6$ is defined as torque ripple $T_{RIP}$, torque ripple $T_{RIP}$ is expressed by Equation (11).

<Mathematical Formula 8>

$$T_{RIP} = \{Kt_5 \times 2(Iq_6 - Id_6) - Kt_7 \times 2(Iq_6 + Id_6)\} - (Ld - Lq) \times 2(Id_6 \times Iq_6) - (Md - Mq) \times 2(Id_6 \times Iq_6) \quad (11)$$

Further, when $K_{t7}$ and the term (Md−Mq) of Equation (11) is neglected using the relationship of $Kt_5 \gg Kt_7$, |Ld−Lq|≫|Md−Mq|, Equation (12) is obtainable.

<Mathematical Formula 9>

$$T_{RIP} \approx Kt_5 \times 2(Iq_6 - Id_6) - (Ld-Lq) \times 2(Id_6 \times Iq_6) \quad (12)$$

Figure 14:
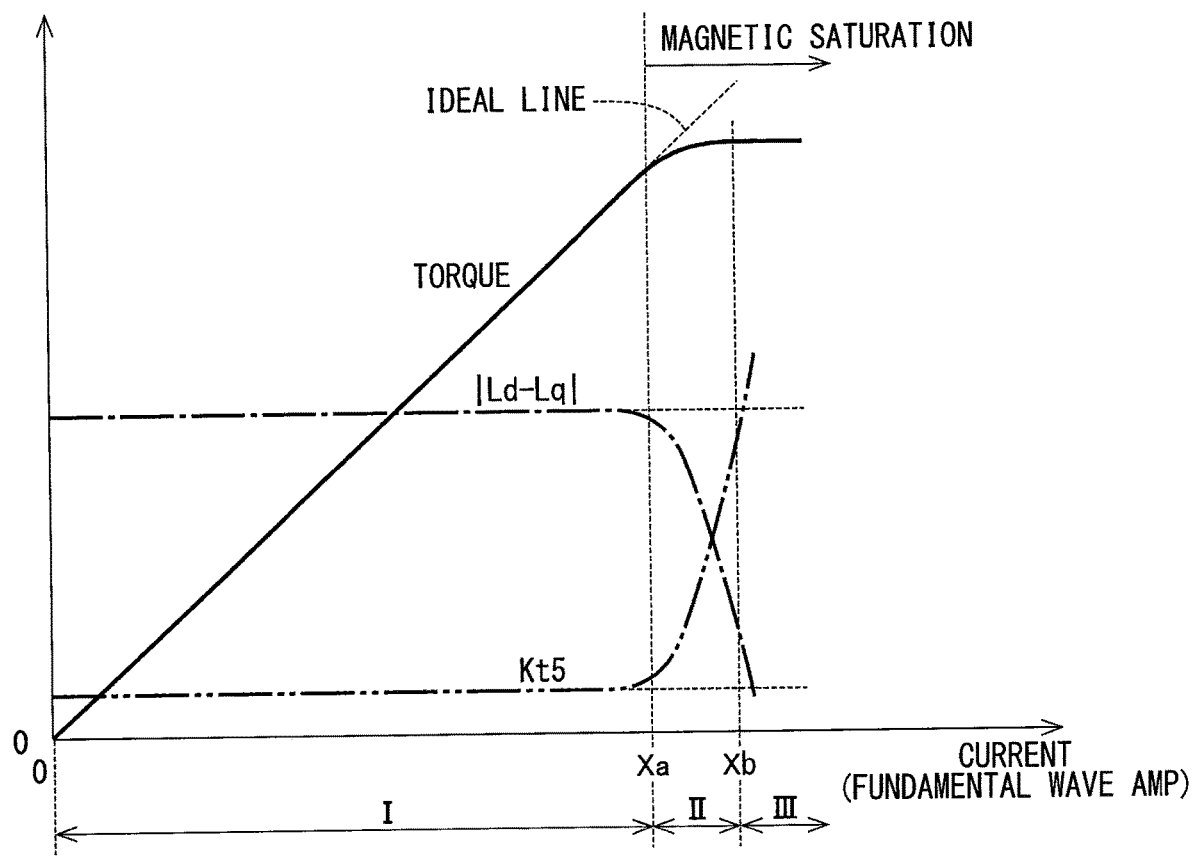
FIG. 14 is a diagram illustrating a relationship of a fundamental wave amplitude with respect to torque, $Kt_5$, and $|Ld-Lq|$.

Next, the influence of magnetic saturation will be described with reference to FIG. 14. FIG. 14 shows the relationship of a current (i.e., fundamental wave amplitude) with reference to torque, a fifth-order torque constant $Kt_5$, and a difference absolute value |Ld−Lq| of the dq-axis inductance. In a non-magnetically saturated region I, the fifth-order torque constant $Kt_5$ and the inductance difference absolute value |Ld−Lq| are constant, and the torque increases substantially in proportion to the current. When the magnetic saturation starts in a region II where the current increases more than the region I, the fifth-order torque constant $Kt_5$ increases and the inductance difference absolute value |Ld−Lq| decreases. The torque loses its proportional relation to the current and falls below the ideal line. In the region III, the current further increases and the magnetic saturation has been reached. The boundary between the region I and the region II and the boundary between the region II and the region III correspond to, for example, a first threshold Xa and a second threshold Xb shown in FIG. 17.

Next, with reference to FIG. 15, the amplitudes $Id_6$, $Iq_6$ of the dq-axis current of the sixth-order component for reducing the torque ripple in each current region will be verified using specific numerical examples. Here, the zeroth-order q-axis current amplitude $Iq_0$ is calculated as 100 A (Ampere).

The fifth-order torque constant $Kt_5$ and the inductance difference (Ld−Lq) in the region I where the current is small and no magnetic saturation occurs are assumed as follows based on the torque constant $Kt_0$ of the zeroth-order component.

$Kt_5 = Kt_0 \times 0.01$ $(Ld-Lq) = -Kt_0 \times 0.1$

Because of the sixth-order d-axis current amplitude $Id_6$=0 and the sixth-order dq amplitude ratio $(Id_6/Iq_6)$=0, the second term of Equation (12) is 0, as shown in (*1), the torque ripple is calculated as $T_{RIP}$=$Kt_0$×0.1 from the first term of Equation (12).

Further, when the sixth-order d-axis current amplitude $Id_6$ and the sixth-order q-axis current amplitude $Iq_6$ are equal and the sixth-order dq amplitude ratio $(Id_6/Iq_6)$=1, the first term of Equation (12) is 0, so that, as shown in (*2), the torque ripple is calculated as $T_{RIP}$=$Kt_0$×5 from the second term of Equation (12). The smaller torque ripple 0.1 is underlined. In the region I, when the sixth-order dq amplitude ratio $(Id_6/Iq_6)$=0, the torque ripple is be further reducible.

The fifth-order torque constant $Kt_5$ and the inductance difference (Ld−Lq) in the region III where the current is large and the magnetic saturation has been reached are assumed as follows.

$Kt_5 = Kt_0 \times 0.08$ $(Ld-Lq) = -Kt_0 \times 0.01$

When the sixth-order d-axis current amplitude $Id_6$=0 and the sixth-order dq amplitude ratio $(Id_6/Iq_6)$=0, the torque ripple is $T_{RIP}$=$Kt_0$×0.8 from the first term of Equation (12) in the same manner as above. When the sixth-order d-axis current amplitude $Id_6$ and the sixth-order q-axis current amplitude $Iq_6$ are equal to each other and the sixth-order dq amplitude ratio $(Id_6/Iq_6)$=1, the torque ripple is calculated as $T_{RIP}$=$Kt_0$×0.5 from the second term of Equation (12) in the same manner as above. The smaller torque ripple 0.5 is underlined. In the region III, when the sixth-order dq amplitude ratio $(Id_6/Iq_6)$=1, the torque ripple is further reducible.

Further, the fifth-order torque constant $Kt_5$ and the inductance difference (Ld−Lq) in the region II, which is intermediate between the region I and the region III, are assumed to be as follows.

$Kt_5 = Kt_0 \times 0.065$ $(Ld-Lq) = -Kt_0 \times 0.065$

In this case, both in a case where the sixth-order dq amplitude ratio $(Id_6/Iq_6)$ is 0 and in a case where the sixth-order dq amplitude ratio $(Id_6/Iq_6)$ is 1, the torque ripple is calculated as $T_{RIP}$=$Kt_0$×0.65 in both the cases. Further, also in a case where the sixth-order dq amplitude ratio $(Id_6/Iq_6)$ is set to a value between 0 and 1, such as 0.2, 0.4, 0.6, and 0.8, and the first and second terms of Equation (12) are added, the torque ripple is calculated as $T_{RIP}$=$K_{t0}$×0.65.

Figure 16:
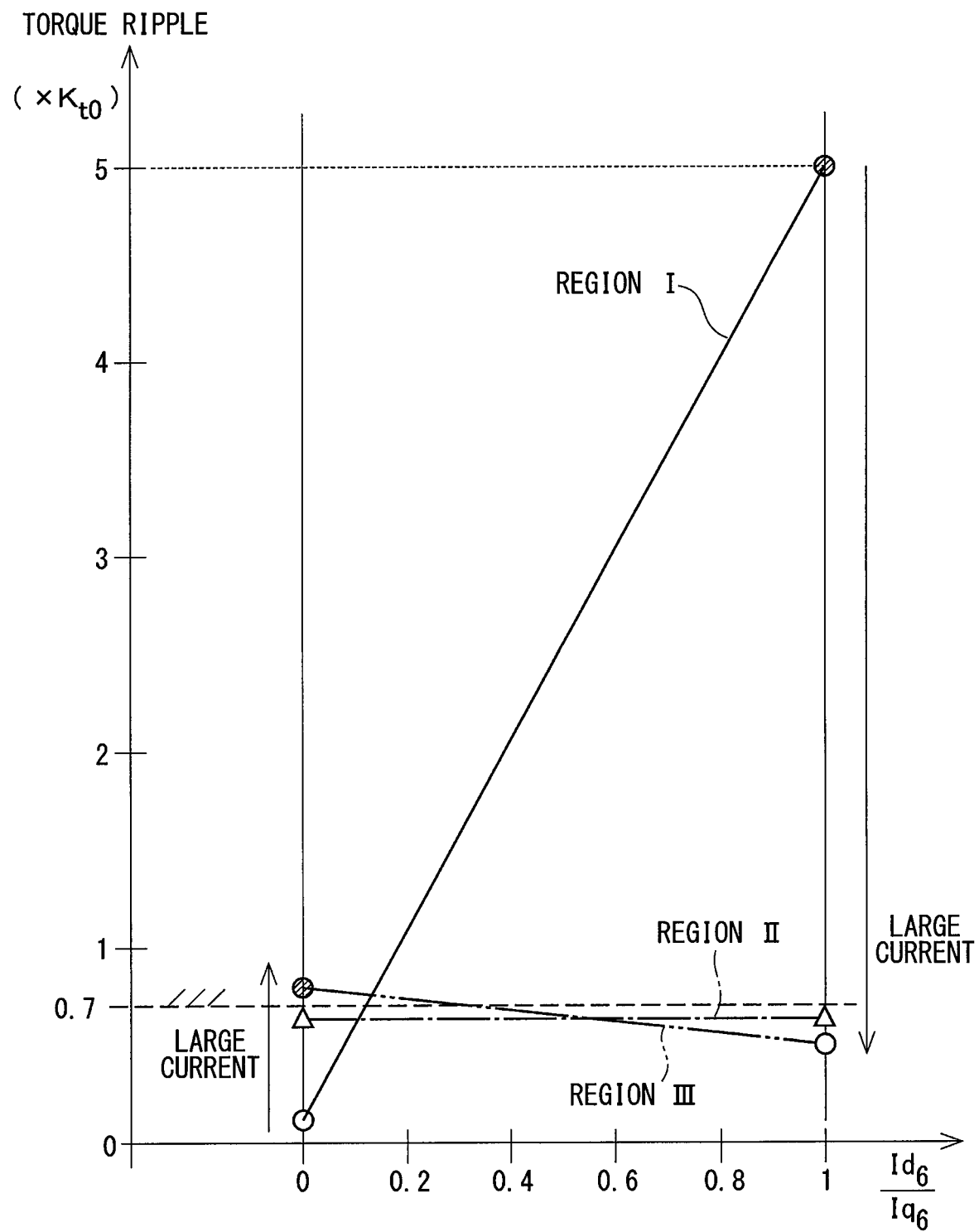
FIG. 16 is a diagram illustrating the relationship between a sixth-order dq amplitude ratio and torque ripple.

The calculation results of the torque ripple according to the above examples are shown in the graph of FIG. 16. Assuming that the allowable threshold of the torque ripple $T_{RIP}$ is $K_{t0}$×0.7, it may be preferable that the sixth-order dq amplitude ratio $(Id_6/Iq_6)$ be set to a value near 0 in the small current region I and to a value near 1 in the large current region III.

Figure 17:
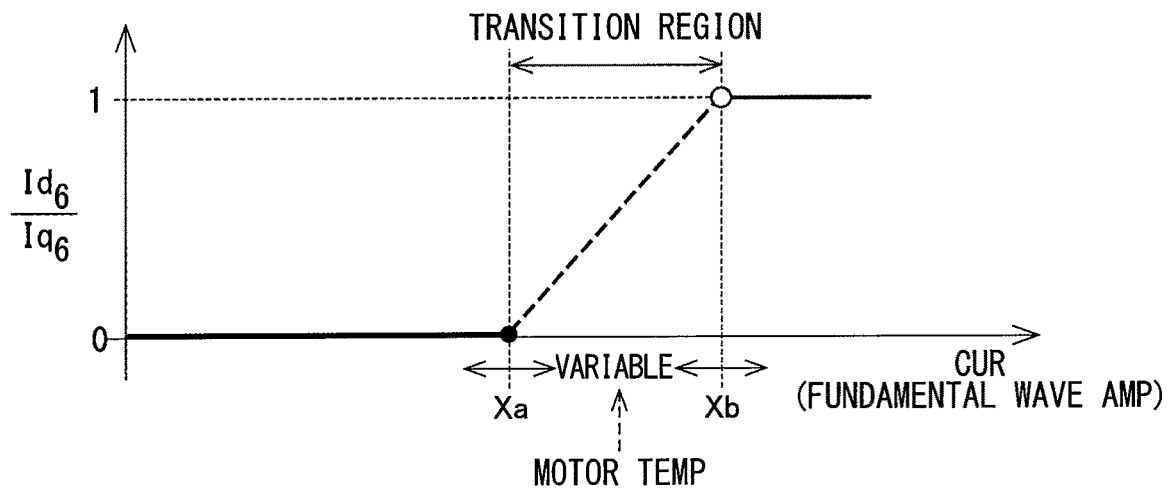
FIG. 17 is a diagram illustrating a first switching example of a sixth-order dq amplitude ratio to a fundamental wave amplitude.
Figure 18:
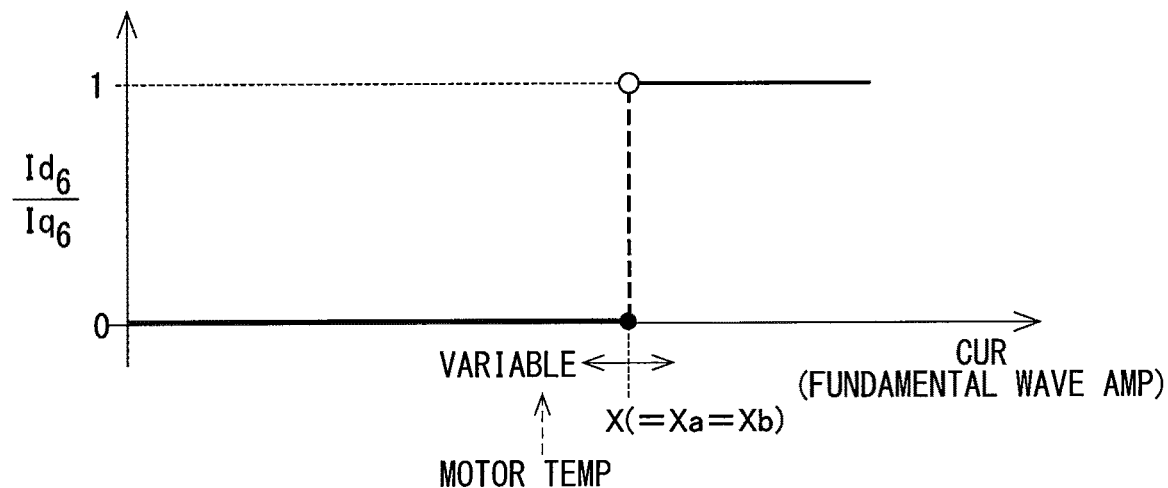
FIG. 18 is a diagram illustrating a second switching example of a sixth-order dq amplitude ratio with respect to a fundamental wave amplitude.

Therefore, as shown in FIGS. 17 and 18, the current amplitude calculation unit 32 switches the sixth-order dq amplitude ratio $(Id_6/Iq_6)$ in accordance with the magnitude relationship between the fundamental wave current amplitude and the first threshold Xa/second threshold Xb. In both FIGS. 17 and 18, Xa≤Xb, that is, the second threshold Xb, is set to the first threshold Xa or larger. For example, the first threshold Xa is set near the upper limit of the non-magnetically saturated region I, and the second threshold Xb is set to the magnetically saturated region II or III.

When the fundamental wave current amplitude is equal to or smaller than the first threshold Xa, the current amplitude calculator unit 32 sets the sixth-order dq amplitude ratio $(Id_6/Iq_6)$ to 0 and the sixth-order dq. When the fundamental wave current amplitude is larger than the second threshold Xb, the current amplitude calculation unit 32 calculates the amplitude $Id_6$ of the sixth-order d-axis current and the sixth-order q-axis current $Iq_6$ so that the amplitude ratio $(Id_6/Iq_6)$ is 1.

In the example shown in FIG. 17, Xa<Xb, that is, the second threshold Xb is set larger than the first threshold Xa. In this case, a region between the first threshold Xa and the second threshold Xb is defined as a transition region. In the transition region, the current amplitude calculation unit 32 sets the sixth-order dq amplitude ratio $(Id_6/Iq_6)$ to a value within the range between 0 inclusive and 1 inclusive.

Patent Literature 1 discloses in its second embodiment that by setting the sixth-order d-axis current $Id_6$ and the sixth-order q-axis current $Iq_6$ to non-zero values, the combination of the amplitudes of the phase current fifth-order component and the phase current seventh-order component is broadly settable in connection with the case of setting the sixth-order d-axis current $Id_6$ to 0. Based on this finding, when the torque ripple $T_{RIP}$ falls below the allowable threshold as shown in FIG. 16, there may be cases where it is preferable to allow the sixth-order d-axis current $Id_6$ and the sixth-order q-axis current $Iq_6$ to flow together instead of taking priority over minimization of the torque ripple $T_{RIP}$. In that case, the sixth-order dq amplitude ratio ($Id_6/Iq_6$) in the transition region is set to a value larger than 0 and smaller than 1.

In the example shown in FIG. 18, X=Xa=Xb, that is, the first threshold Xa and the second threshold Xb are set to the same value X. In this control example, the sixth-order dq amplitude ratio ($Id_6/Iq_6$) is selected from binary values of 0 and 1, which may realize configuration simplification. The threshold X corresponds to the predetermined value X used in the description of the current amplitude calculation unit 32 and the current phase calculation unit 35.

Here, the current amplitude calculation unit 32 may variably set the first threshold Xa and the second threshold Xb in accordance with predetermined parameters. The predetermined parameters include a motor temperature and the like that influence the magnetic characteristics. For example, at the beginning of manufacturing, default values of the first threshold Xa and the second threshold Xb are set in accordance with magnetic characteristics at a reference temperature, but control conditions are appropriately adjusted by changing the thresholds Xa, Xb in accordance with temperatures of use environments. In the example shown in FIG. 18, a single threshold X is variably set.

<Technical Effects>

Patent Literature 1 fails to address reduction in torque ripple in a region where magnetic saturation occurs. In contrast to this, the control unit 65 of the present embodiment changes the amplitude ratio ($Id_6/Iq_6$) of the dq-axis current of the sixth-order component to be superimposed on the zeroth-order component on the dq coordinates in accordance with the fundamental wave current amplitude. Therefore, in the motor 80 for generating torque being a sum of magnet torque and reluctance torque, it is possible to appropriately reduce heat generation without increasing torque ripple $T_{RIP}$ even when either a small current or a large current is supplied.

In particular, in the case of the electric power steering apparatus for the vehicle, a large current needs to be supplied by the small-sized ECU 10 due to restrictions on the mounting space and the like. Hence there are strong needs to reduce the phase current peak to reduce heat generation and loss. Incidentally, noise and vibration due to torque ripple have a great influence on the driver's steering feeling and marketability. Hence, there are also strong needs to reduce torque ripple. Therefore, the present embodiment is particularly effective in an electric power steering apparatus required to simultaneously achieve both the reduction in large-current-caused heat generation and the reduction in torque-ripple-caused noise and vibration.

<Other Embodiments>

(a) In the above embodiment, an embedded magnet type rotary machine is used as a typical three-phase rotary machine for generating torque being a sum of magnet torque and reluctance torque. However, since even a surface magnet type rotary machine may generate a minute reluctance torque technical ideas of the present disclosure are applicable to a control device of the surface magnet type rotary machine.

(b) In the above embodiment, the control of the current amplitude of the dq-axis sixth-order component, which is coordinate-converted to the phase current fifth-order and seventh-order components in the three-phase rotary machine, is described. In addition to the dq-axis sixth-order component, this control is similarly applicable to each order component expressed generally as 6(2k+1)th-order (k is an integer of 0 or larger), such as eighteenth-order and thirtieth-order components.

(c) In the above embodiment, the magnitude of the sixth-order d-axis current $Id_6$ is the same at the amplitude ratio of 1 and the amplitude ratio of 0. However, since the peak is reducible by increasing the sixth-order d-axis current $Id_6$ at the amplitude ratio 1, the sixth-order d-axis current $Id_6$ may be larger at the amplitude ratio of 1 than at the amplitude ratio of 0.

(d) The control unit may include the torque ripple compensation amount calculator described in FIG. 15 of the third embodiment in Patent Literature 1 and may include the configuration for the DT (dead time) compensation described in FIG. 16 of the fourth embodiment in Patent Literature 1. Further, as described in in "Other Embodiments (c) in Patent Literature 1, the feedback control may be performed on the current command values for the respective systems, instead of the configuration in which the feedback control is performed on the sum and difference of dq-axis current command values.

(e) Specific configurations of the control device of the three-phase rotary machine are not limited to those illustrated in FIG. 2, FIG. 3 and the like of the above embodiment. For example, the switching element of the inverter may be a field effect transistor other than a MOSFET or may be an insulated gate bipolar transistor (IGBT).

(f) The control device of the three-phase rotary machine of the present disclosure is not limited to the control device of the steering assist motor of the electric power steering apparatus and may be applied to other three-phase motors or power generators.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for a three-phase rotary machine,
the three-phase rotary machine including two sets of three-phase windings and being configured to generate torque being a sum of magnet torque and reluctance torque when alternating currents with different phases are supplied to the two sets of three-phase windings,
the control device comprising:
two power converters that are provided corresponding to the two sets of three-phase windings and that output alternating currents with a same amplitude and a phase difference of (30±60×n) degrees to the two sets of three-phase windings, where n is an integer; and
a control unit that controls energization of the three-phase rotary machine by calculating a d-axis current and a q-axis current of a 6(2k+1)th component to be superimposed on a fundamental wave component on dq coordinates so as to reduce a peak value of phase current that is supplied to the two sets of three-phase windings, where k is an integer of 0 or larger, wherein
when a ratio of an amplitude of the d-axis current of a $6(2k+1)$th component to an amplitude of a q-axis current of the $6(2k+1)$th component is defined as a high-order dq amplitude ratio,
the control unit calculates the d-axis current and the q-axis current of the $6(2k+1)$th component so that the high-order dq amplitude ratio is 0 when a fundamental wave current amplitude is equal to or smaller than a first threshold, and the high-order dq amplitude ratio is 1 when the fundamental wave current amplitude is larger than a second threshold that is equal to or larger than the first threshold.

2. The control device according to claim 1, wherein
where the second threshold is set to be larger than the first threshold, a region of the fundamental wave current amplitude between the first threshold and the second threshold is defined as a transition region,
in the transition region, the control unit sets the high-order dq amplitude ratio to a value within a range between 0 inclusive and 1 inclusive.

3. The control device according to claim 1, wherein
the control unit variably sets the first threshold and the second threshold in accordance with a predetermined parameter including a temperature of the three-phase rotary machine.

4. The control device according to claim 1, wherein
the control device is applied to an electric power steering apparatus of a vehicle and controls drive of a steering assist motor serving as the three-phase rotary machine.

\* \* \* \* \*